(12) United States Patent
Smith et al.

(10) Patent No.: US 7,463,907 B2
(45) Date of Patent: *Dec. 9, 2008

(54) PLUG-IN NETWORK APPLIANCE

(75) Inventors: Derek M. Smith, San Diego, CA (US); James D. Adams, San Diego, CA (US); Nicolas C. Nierenberg, La Jolla, CA (US); Joseph C. Baker, Encinitas, CA (US)

(73) Assignee: Awarepoint Corporation, San Diego, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 11/617,731

(22) Filed: Dec. 29, 2006

(65) Prior Publication Data

US 2007/0197262 A1 Aug. 23, 2007

Related U.S. Application Data

(63) Continuation of application No. 11/008,802, filed on Dec. 8, 2004, now Pat. No. 7,324,824, which is a continuation-in-part of application No. 10/968,814, filed on Oct. 18, 2004, now Pat. No. 7,312,752.

(60) Provisional application No. 60/528,052, filed on Dec. 9, 2003, provisional application No. 60/572,690, filed on May 19, 2004.

(51) Int. Cl.
*H04B 5/00* (2006.01)
*H04B 7/00* (2006.01)
*H04B 1/38* (2006.01)
*H04Q 7/20* (2006.01)
*H04Q 7/00* (2006.01)
*H04M 1/00* (2006.01)

(52) U.S. Cl. .................. 455/562.1; 455/41.2; 455/462; 455/500; 455/554.1; 455/554.2; 455/555; 455/561

(58) Field of Classification Search ......... 370/328–329, 370/338, 341, 395.5–395.54, 901, 911, 913, 370/285, 908; 455/41.2–41.3, 74, 74.1, 90.3, 455/344–349, 403, 404.2, 456.1–456.6, 462–466, 455/524–526, 550.1, 554.1–554.2, 555, 556.1–556.2, 455/557–559, 561, 414.1, 414.4, 418, 500, 455/552.1, 562.1; 342/385, 450, 463–465; 340/539.1–539.19, 563, 573.4, 686.6; 710/305–316
See application file for complete search history.

(56) References Cited

U.S. PATENT DOCUMENTS 3,805,265 A 4/1974 Lester (Continued)

*Primary Examiner*—Meless N Zewdu
(74) *Attorney, Agent, or Firm*—Clause Eight LLP; Michael Catania; Elaine Lo

(57) ABSTRACT

A plug-in network appliance is disclosed. In one aspect, a network appliance performs a bridge between two wireless communication formats. In another aspect, a network appliance is deployed to perform position location services. In another aspect, a mesh network comprising one or more network appliances is deployed. A mesh network comprising one or more network appliances may be deployed to perform position location services. A plug-in form factor is described. A network appliance may convert power received from a plug in a first format to power in a second format for powering various components. A network appliance may connect with a wireless network and/or a network connected through a plug. A plug-in network appliance may connect to a weight-bearing outlet. Various other aspects are also presented.

22 Claims, 23 Drawing Sheets

U.S. PATENT DOCUMENTS

| | | |
|---|---|---|
| 3,869,673 A | 3/1975 | Close |
| 5,119,104 A | 6/1992 | Heller |
| 5,402,450 A | 3/1995 | Lennen |
| 5,450,615 A | 9/1995 | Fortune et al. |
| 5,496,966 A * | 3/1996 | Hightower et al. .......... 174/353 |
| 5,977,913 A | 11/1999 | Christ |
| 6,259,406 B1 | 7/2001 | Sugiura et al. |
| 6,259,894 B1 | 7/2001 | Tekinay |
| 6,342,854 B1 | 1/2002 | Duffett-Smith et al. |
| 6,493,377 B2 * | 12/2002 | Schilling et al. ............ 375/130 |
| 6,529,164 B1 | 3/2003 | Carter |
| 6,697,415 B1 * | 2/2004 | Mahany ..................... 375/130 |
| 6,731,904 B1 * | 5/2004 | Judd ......................... 455/11.1 |
| 6,799,047 B1 | 9/2004 | Bahl et al. |
| 6,839,027 B2 | 1/2005 | Krumm et al. |
| 6,839,560 B1 | 1/2005 | Bahl et al. |
| 6,889,032 B2 | 5/2005 | Dao et al. |
| 6,915,135 B1 | 7/2005 | McKee et al. |
| 6,929,549 B1 * | 8/2005 | Yamada ....................... 463/42 |
| 6,990,428 B1 | 1/2006 | Kaiser et al. |
| 7,020,701 B1 * | 3/2006 | Gelvin et al. ............... 709/224 |
| 7,050,819 B2 | 5/2006 | Schwengler et al. |
| 7,084,740 B2 | 8/2006 | Bridgelall |
| 7,312,752 B2 * | 12/2007 | Smith et al. .................. 342/464 |
| 7,324,824 B2 * | 1/2008 | Smith et al. ............... 455/456.1 |
| 2004/0136384 A1 | 7/2004 | Cho |
| 2004/0147232 A1 | 7/2004 | Zodnik |
| 2004/0157551 A1 | 8/2004 | Gainey et al. |
| 2004/0212500 A1 | 10/2004 | Stilp |
| 2004/0235468 A1 | 11/2004 | Luebke et al. |
| 2005/0042999 A1 * | 2/2005 | Rappaport ................... 455/307 |
| 2005/0075118 A1 | 4/2005 | Lewis et al. |
| 2006/0098592 A1 * | 5/2006 | Proctor, Jr. et al. .......... 370/315 |

* cited by examiner

PLUG-IN NETWORK APPLIANCE

CROSS REFERENCES TO RELATED APPLICATIONS

The Present application is a continuation application of U.S. patent application Ser. No. 11/008,802, filed on Dec. 8, 2004, which claims priority to U.S. Provisional Application No. 60/528,052, filed Dec. 9, 2003, U.S. Provisional Application No. 60/572,690, filed May 19, 2004, and U.S. patent application Ser. No. 10/968,814, filed Oct. 18, 2004.

STATEMENT REGARDING FEDERALLY SPONSORED RESEARCH OR DEVELOPMENT

Not Applicable

BACKGROUND OF THE INVENTION

1. Field of the Invention

The present invention relates generally communications, and more specifically to a plug-in network appliance.

2. Description of the Related Art

There is a well-established demand for wireless networking devices. Connectivity is desired without the need for installing and maintaining various wires and cables, and the convenience of fewer such wires within the home, office, or other facility. Various wireless networking components, such as access points and user terminals, are well known in the art.

There is a further demand for reducing or eliminating power connections whenever possible. Batteries are used for a wide variety of applications, particularly mobile applications. However, in many instances, due to limitations in battery life, it is often convenient to use a powered device within a network. In a typical home or office, power outlets are readily available. However, typical network devices deployed today include a plug and an associated power cable, and in many cases, an external power supply. This adds to the cost, and bulkiness of the device. Certain products have addressed this issue. A wireless access point that plugs directly into Alternating Current (AC) power wiring is the SpeedStream Powerline 802.11b access point available from Siemens AG, of Germany. This wireless access point uses the HomePlug standard for delivering network data across a power network.

With the proliferation of wireless networks and devices, multiple new products and services that use such networks have been and will be introduced. Different services and products may use different communication formats (i.e. differing standard air interfaces, modulation formats, etc.) There is a need in the art to provide a bridge from one communication format to another while maintaining a desired form factor.

For example, various communication formats may be deployed to utilize low power, varying data throughput rates, and the like. Examples include Wireless Local Access Network (WLAN) standards such as IEEE 802.11, 802.15.4, and derivatives thereof. Various cellular based communication formats are also known. Other wireless communications standard or specification may also be deployed. Example cellular-based data systems include: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard). Other wire replacement formats, such as Bluetooth, are known. Optical formats may also be utilized, including infrared, such as detailed by the Infrared Data Association (IrDA).

Example wireless services include position location services. In a wireless position location system, one or more devices may communicate using one or more communication formats. Position information may be relayed to and from devices within the system and a position location engine for determining the location of those objects. There is a further need in the art for a network appliance to provide network services within a compact form factor.

BRIEF SUMMARY OF THE INVENTION

The present invention discloses the use of a plug-in network appliance for providing network services. Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
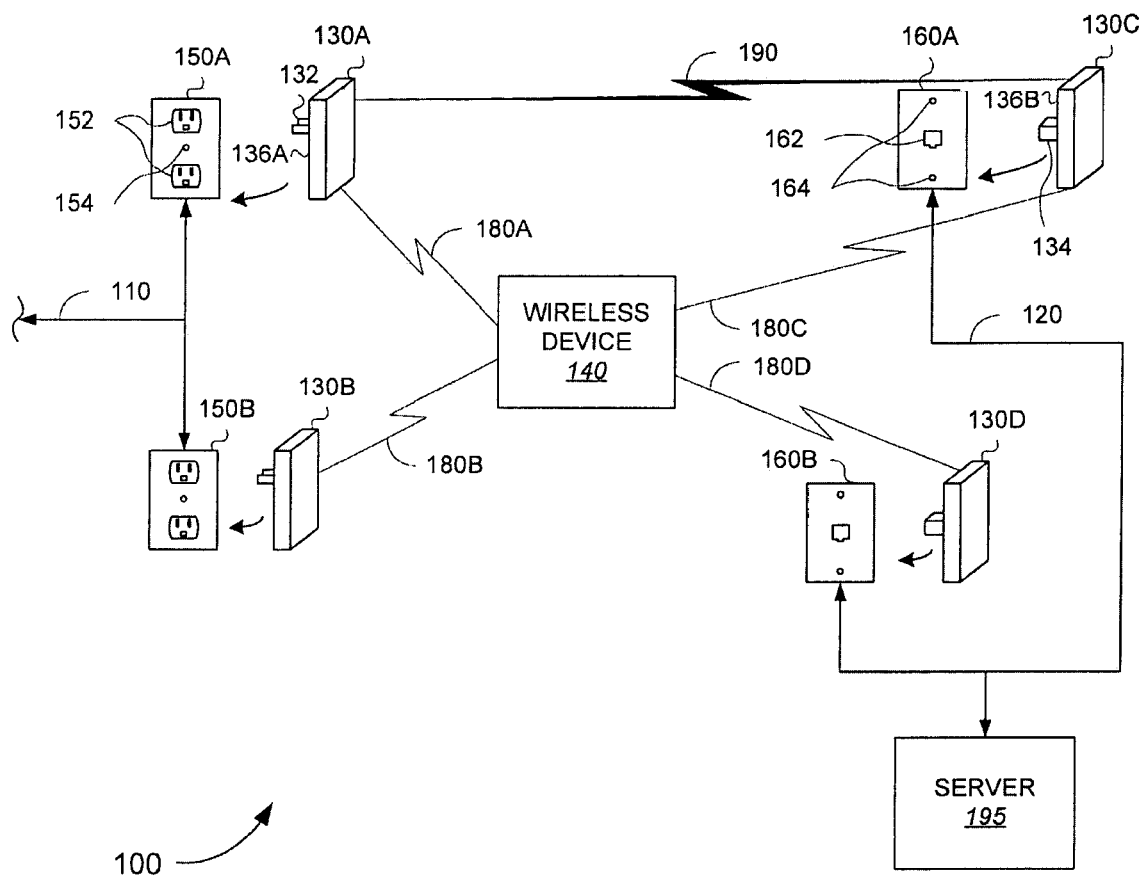
FIG. 1 depicts an example embodiment of a system employing, among other things, example embodiments of network appliances.

One or more exemplary embodiments described herein are set forth in the context of a wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. The word "exemplary" is used herein to mean "serving as an example, instance, or illustration." Any embodiment described herein as "exemplary" is not necessarily to be construed as preferred or advantageous over other embodiments.

In one embodiment, a plug-in network appliance is configured so as to plug into an outlet of one or more various types to provide power to the network appliance. For example, the plug may be configured to couple with a standard Alternating Current (AC) power outlet (including any of the various formats for plugs, voltages, receptacles, outlets and the like, deployed throughout the world). For example, in North America, a common plug conforms to the National Electrical Manufacturer's Association (NEMA) 5-15R receptacle. In an alternate embodiment, an alternate plug may be used, such as an RJ-45 plug, commonly used in network systems, or an RJ-11 plug, commonly used in telephone systems. In one embodiment, a power network, including an AC power communication, may also incorporate a data network. A data network may also be used to provide power. A network appliance may transmit and/or receive data from an attached data network (i.e. through an RJ-45 jack) as well as receives power from that plug, or may simply receive power from that network. A network appliance may be configured to include plugs of various types and also may incorporate combinations of various plugs.

The plug-in form factor detailed herein provides various general benefits, as well as specific benefits for use in position location services. Example general benefits include the following: Standard electrical formats in various geographical regions provide plentiful outlets with known parameters. For example, in North America, the NEMA5-15R receptacle will always be 110-120VAC at 60 Hz. The plug dimensions are standardized. Often outlets are at known locations (typically shown on electrical plans and drawings, which are useful for planning a network topology. Outlets may be load bearing for a given amount of weight. Standardized outlets provide for ease of securing to a wall (or other structure). Appliances may be installed or removed with relative ease, without modifications or damage to walls. Outlets are generally relatively plentiful (typically at least one in each room, often placed one per 10 feet of wall for any wall longer than 5 feet) and are easy to find. Outlets are generally maintained, and maintenance is relatively straightforward. Use of outlets is intuitive to the lay user, including security attachments. Availability of an all-in-one enclosure (or other structure) provides for economical and robust products. A plug-in form factor may eliminate the need for cables. Abundant power may be made available, a benefit for general network functions, and particularly useful for wireless networks. Rapid installation may be provided. As detailed further below, a power line may be optionally deployed as a primary network, or a secondary network to add redundancy to another network.

Benefits for position location appliances include all of the above benefits, as well as examples including the following: When secured, a device is more unlikely to be moved. There are often outlets available at facility perimeters, which may be beneficial in certain position location deployments. Using outlets at known locations is convenient for deploying appliances for which a known location is desired; examples are described below (network monitors, for example). Architectural or electrical plans, and plans in electronic format particularly, may be adapted for use in position location systems. Outlets, or subsets thereof, may have consistent heights (i.e. a Z value) throughout a facility (i.e., 12" or 18" AFF—Above Finished Floor). This feature may provide consistency for two-dimensional location determination, as well as for three-dimensional position location.

The plug-in network appliance may be deployed to perform various network applications, such as bridging between different wireless communication formats (as well as with wired communication formats), position location services, and others, examples of which are detailed herein. The plug-in form factor of network appliance embodiments, detailed herein, allows for, among other things, a compact form factor without the cost and space required to implement external power cables and/or power supplies. One or more network appliances may be conveniently deployed throughout a system, such as an office, home, industrial or other physical plant, to support wireless communication services of various kinds. As detailed herein, by utilizing available power sources, these network appliances may be used continuously without the need for an expensive or inconvenient battery. They also may be used in conjunction with battery-powered devices to implement low power strategies, as well as with conventional wired and/or wireless data networks.

A plurality of plug-in network appliances may be deployed to form a network mesh comprising support for one or more communication formats. The network mesh may comprise one or more connections to an external network (i.e. the Internet or a facility intranet) through one or more network appliances via either a wired or wireless connection. The network mesh may comprise various other devices other than plug-in network appliances as well. User Terminals (UTs) or other wireless equipped objects (i.e. asset-tracking tags) may communicate on the network mesh via links with one or more plug-in network appliances, examples of which are detailed herein. Each link between mesh nodes may comprise one of a plurality of supported communication formats. Each link from a device (i.e. a UT or tag) to a plug-in network appliance may comprise one of a plurality of supported communication formats. The set of supported formats for the mesh network need not be the same as the set of supported formats for links to objects such as UTs Or tags. A network appliance, including a wireless network bridge, detailed further below, may also serve to bridge two or more wireless mesh networks, in which each mesh network communicates according to a specific wireless communication format.

Mesh networks consist of a plurality of nodes, each node having a unique identifier (unique to the network). The nodes are deployed and may automatically establish communication links there between, for example as described using the Ad hoc On Demand Distance Vector (AODV) routing algorithm, Zigbee, and other routing algorithms known in the art. Once the mesh network is configured (either automatically or manually), a node may send data to another non-adjacent node by first transmitting the data to an adjacent node, which transmits the data to another node, etc., until the data reaches its destination. In this example, a mesh network is considered to be set up when each node knows (in a routing table) how to transmit data to other nodes. The mesh network may also periodically test links and update the routing tables on one or more nodes if the network has changed (for example, a node was removed or a link is broken). In this manner, the network may be made very reliable.

FIG. 1 depicts an example embodiment of a system employing, among other things, several example embodiments of plug-in network appliances. In this example, network appliances 130 are plugged into receptacles 152 or 162 of outlets 150 or 160, respectively. As described above, network appliances 130 may be adaptable for use with one or more plug types. In this example, appliance 130A is configured with an AC power plug 132, suitable for insertion into receptacle 152 of outlet 150A. Appliance 130B is similarly configured for connection to outlet 150B. Appliances 130C and 130D are configured for insertion into RJ-45 plugs. In this example, appliance 130C may be coupled with outlet 160A by inserting plug 134 into receptacle 162. Outlets are generally mounted to a wall (or floor, or ceiling) or other rigid support structure (i.e. furniture, lab benches, rack mounts, etc.). Outlets may also be affixed to a cable. A plug 132 or 134 is connected physically and electrically to the outlet 150 or 160. The plug may bear the weight of the plug-in network appliance 130. An outlet, once connected, may similarly bear the weight of the plug-in network appliance (in certain embodiments, the security attachment 136, detailed below, may be connected and bear some or all of the weight of the network appliance).

It is common for outlets, such as 150 or 160, to be covered with a plate, often held in place with a device such as one or more screws and threadings 154 or 164. In this example, appliance 130A is equipped with a security attachment 136A for securely fastening network appliance 130A to outlet 150A. Security attachment 136B is similarly shown for securely connecting network appliance 130C to outlet 160A. A locking mechanism may also be deployed to connect a network appliance 130 to outlet 150 or 160 to prevent against accidental dislodgement, theft, tampering, etc. In one example, a replacement screw may be inserted through or protrude forth from network appliance 130A into the threading 154 (or one or more screws may similarly attach to threading 164). A security attachment may comprise any component for which a tool (which may be general purpose, such as a screwdriver, or a task specific or keyed tool) to attach or remove the network appliance. Various other types of security attachments will be readily apparent to one of ordinary skill in the art.

The AC power outlets 150A-B are connected to a power source over power line network 110. In one embodiment, a data network may be deployed on power network 110 as well (for example, the HomePlug standard). In an alternate embodiment, power network 110 is used solely for providing power to outlets 150. Thus, network appliances 130A-B, when connected to outlets 150A-B, may receive power for powering associated circuitry for performing various network services, examples of which are detailed herein. A network appliance 130 may also be configured to receive data through AC power plugs 132 (whether or not data is available on the power network 110 to which it is connected). When a data network is available, and a network appliance is so configured, the network appliance may receive power as well as receive and transmit data on the data network.

In similar fashion, outlets 160A and 160B are connected via data network 120. Network monitors 130C and 130D may be configured to transmit and receive data on this data network 120. In an alternate embodiment, no data connection is made with network 120, but a power supply (details not shown) may be connected to the data network to power various components contained within the network appliance. For example, a Power over Ethernet (POE) system is described in IEEE standard 802.3af. One example PoE power supply is the TIPTB48540AAH from Texas Instruments in Dallas, Tex. Thus, a network appliance 130C or 130D, connected to data network 120, may receive power, data, or both from data network 120.

Server 195 is shown connected to data network 120. Server 195 may be used to receive and transmit data to one or more devices connected to network 120, including network appliances 130C and 130D, as appropriate. Server 195 may be used for any type of processing. An example of a position location application is detailed further below.

A wireless device 140 is shown communicating with various network appliances 130 over a wireless network 180 (in particular, links 180A-D are shown). Wireless link 190 is also shown connecting network appliance 130A to network appliance 130C. The communication format for wireless link 180 may be different than the communication format for wireless link 190. Note that the connection between two network appliances is shown for example only. In general, a network appliance 130 may communicate with any number of wireless devices, other network appliances, and various other networking equipment known in the art or yet to be developed. An example position location system, incorporating various wireless network devices, is detailed further below.

Thus, a network appliance may receive data and transmit data on one wireless network according to a first communication format and transmit and receive data on a second wireless connection according to a second communication format, while receiving power from an outlet, in a compact plug-in form factor. This allows network appliances to be advantageously deployed as appropriate to provide various network services. One example network service is to provide a bridge between wireless device 140 and another device, such as network appliance 130C. In an alternate embodiment, not shown, communication link 190 may connect to an access point (which may have a wired connection to the internet, or other data network). Link 180 may be in a low power format, such as 802.15.4, while wireless link 190 may be an 802.11 link (or another data link, such as a cellular data connection). Thus, a wireless network bridge is formed conveniently between the wireless device 140 and an external network, allowing for wireless device 140 to reduce power requirements and extend battery life.

In an alternate embodiment, a network appliance 130 may be deployed as a network monitor, examples of which are detailed further below, for use in a position location system. In this example, position location services may use a link, such as 190, or a wired connection such as powered network 110, or data network 120, to deliver position location information to a server 195. An example server 195 may include a position location engine, detailed below. The plug-in form factor of network appliance 130 is well suited to such a position location system. A plurality of such appliances 130 may be distributed throughout a facility in which wireless tracking is desired. By plugging into any available outlet, such as an AC outlet 150 or data outlet 160, for example, the devices may be located conveniently throughout the facility. An additional security attachment such as security attachment 134, examples include those described above, may be used to ensure the integrity of the network appliance, or its location, and prevent against accidental or intentional dislodging of the device.

Figure 2:
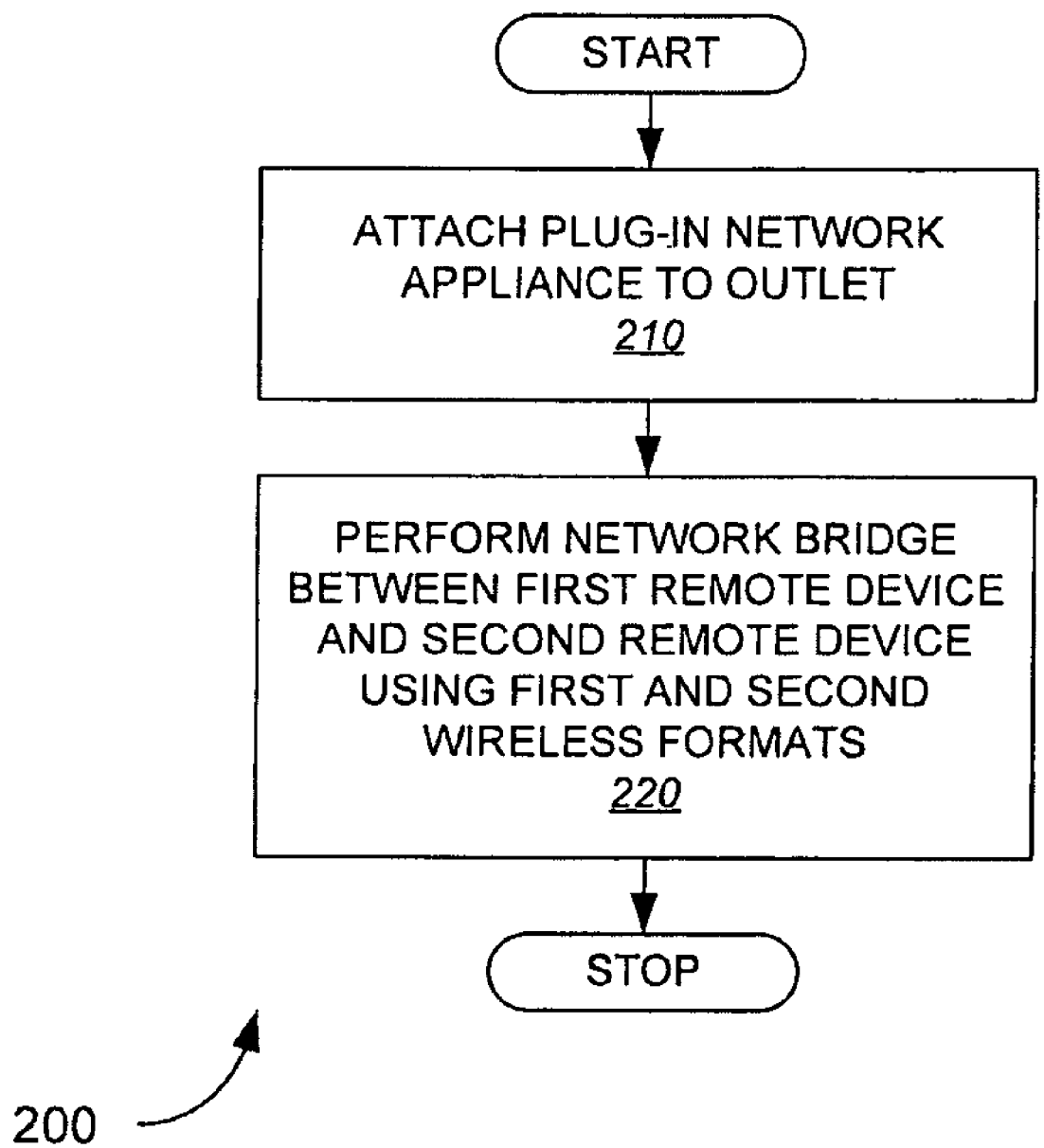
FIG. 2 depicts an example embodiment of a method for providing a wireless bridge with a plug-in network appliance.

FIG. 2 depicts an example embodiment of a method 200 for providing a wireless bridge with a plug-in network appliance. At 210, attach the plug-in network appliance, such as network appliance 130, to an outlet, such as outlet 150 or 160, via receptacle 152 or 162, respectively, described above. In this example, a network appliance receives power through the connection to the outlet. The appliance may or may not also have a data connection through outlet 150. At 220, the network appliance performs a network bridge between a first remote device and a second remote device, using first and second wireless formats. For example, a remote wireless device may communicate with a network appliance on the first communication format (for example, a low power connection). The network appliance may also communicate with a second remote device, such as an access point, another mobile wireless device, another network appliance, (such as a network monitor) and the like. The second format may or may not be low power. Data received from one remote device at the network monitor directed to a second remote device is transferred from the first wireless link to the second wireless link. Similarly, data from the second device, directed to the first device, is received at the network appliance on the second wireless link and transferred to the first device on a first wireless link. Data may optionally be stored in memory after being received on one network and retrieved from memory for transmitting on a second network. All of this may be performed with the benefit of the plug-in form factor and the power received through wired network 110 or 120, for example.

Figure 3:
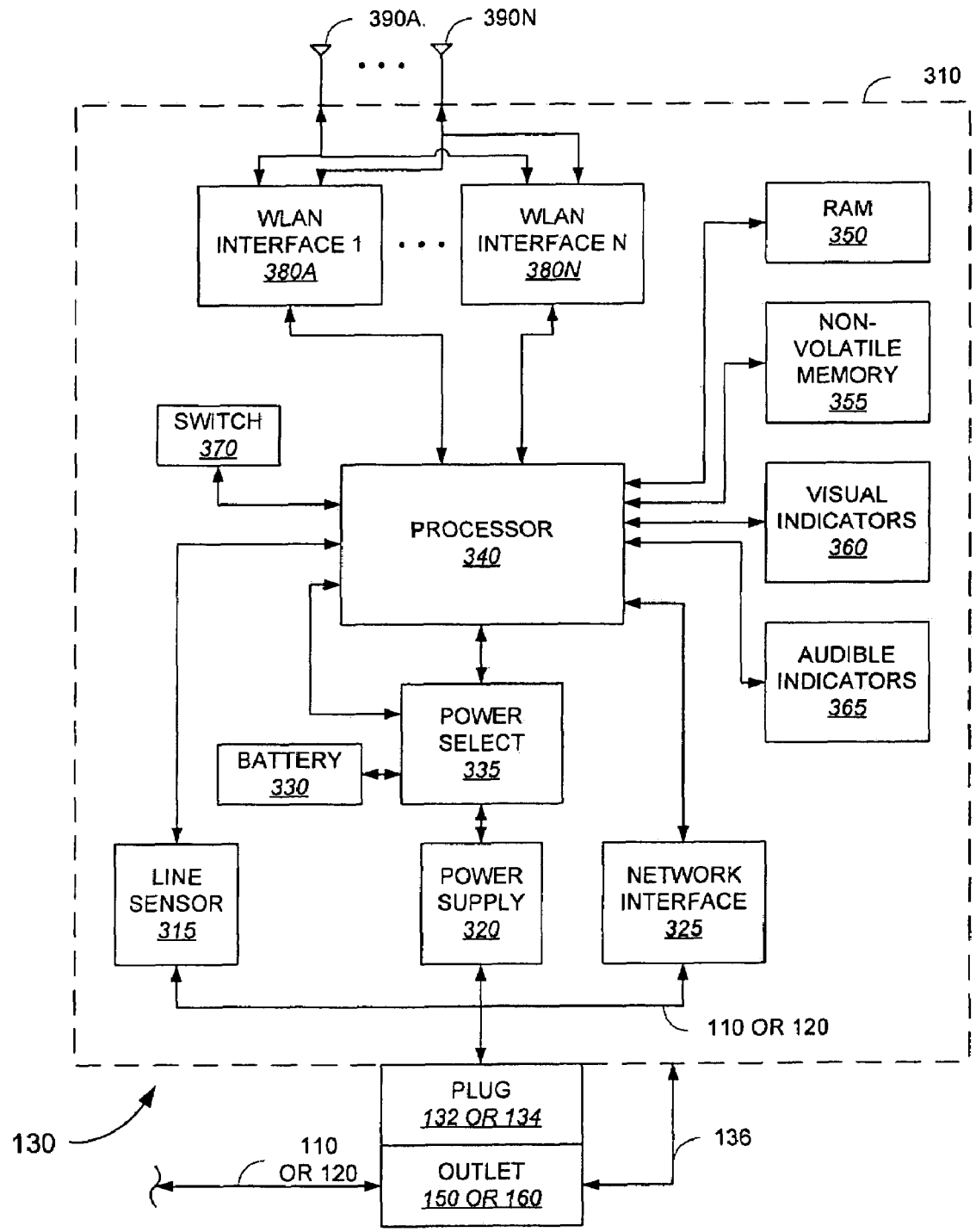
FIG. 3 depicts an example embodiment of a network appliance.

FIG. 3 depicts an example embodiment of a network appliance 130 (along with an example attachment to an outlet 150). Network appliance 130, in this example, comprises an enclosure 310 fixably attached to a plug, such as plug 132 or 134, described above. In an alternate embodiment, any rigid support may be used in place of an enclosure 310. Thus, as detailed further below, the components of the network appliance 130 are fixably attached to the enclosure or rigid support 130, whether or not the components are enclosed by the support. As used herein, the term enclosure is used to describe any rigid support member or structure, including an enclosure. The term "fixably attached" is used to mean connected in a rigid or semi-rigid manner. Thus, for example, when a plug is connected to a wall-mounted outlet, any components fixably attached to the plug are connected to the plug in such a fashion that the plug would bear the weight of the fixably attached components (although additional support members, such as a security attachment may also be connected to bear some or all of the weight, in some embodiments). For example, an enclosure fixably attached to a plug, when the plug is inserted into a typical wall-mounted outlet, will be supported by the plug (as well as the outlet). Components within the enclosure will naturally also be fixably attached to the plug. Components attached to the enclosure may or may not be fixably attached. For example, an external cable may be attached to the outlet, but may or may not be supported by the plug. An attached cable that is supported by another device (such as another apparatus, or the floor, or a conduit, etc.) may not be fixably attached. Components fixably attached need not be immobile. For example, components may be fixably attached and may still rotate, adjust, swing, slide, depress, etc.

One or more antennas 390A-N may be attached to enclosure 310, as shown in this example, or may be incorporated within enclosure 310. In this example, plug 132 or 134 is connected by insertion into outlet 150 or 160, respectively, and may include security attachment 136 for ensuring that the plug-in network appliance 130 remains attached to outlet 150 or 160. Outlet 150, or 160, is shown connected to power network 110, or network 120, respectively, for receiving power and optionally for receiving and transmitting data, as described above.

Within enclosure 310 (or attached to another rigid structure, in an alternate embodiment), a variety of example components of a network appliance are shown. These blocks are illustrative only. Various other embodiments may comprise alternate configurations and may comprise additional components as well as excluding others, as would be readily apparent to one of skill in the art. As described above, plug 132 or 134 makes a physical connection via outlet 150 or 160 to a network 110 or 120. Thus, within enclosure 310, an extension of network 110 or 120 or a portion thereof, may be found connected to line sensor 315, power supply 320, and network interface 325.

Power supply 320 is used to generate the appropriate power level for one or more components within network appliance 130 from network 110 or 120. In one embodiment, power supply 320 receives an AC voltage and may transform that to the appropriate Direct Current (DC) voltage level required by the various components. In an alternate embodiment, power supply 320 forms a network conversion to a power supply, such as the Power over Ethernet standard, introduced above. An example power supply is the PWB-5000 available from Astrodyne of Taunton, Mass. One example of a PoE power supply is the TIPTB48540AAH made by Texas Instruments of Dallas, Tex. A power supply may also be referred to as a power converter, when a power supply input in one power format (i.e. AC or an Ethernet data line) is converted to another power format, with characteristics such as AC or DC, frequency, phase, voltage, current, waveform, etc. In this example, AC or Ethernet power is converted to DC using any AC/DC conversion techniques or data/DC conversion techniques (such as PoE).

Power select block 335 is optional. It is shown connected to battery 330 (another option), as well as power supply 320. Processor 340 receives power from power select 335 and also connects with power select 335 for control. Power select 335 may be directed to power the processor as well as various other components (details not shown) with the output of power supply 320 or battery 330. Note that battery 330 may be any type of battery, well known in the art, and may include other power sources such as capacitors and the like.

Line sensor 315 is connected to the internal network 110 or 120 connection and may be used to measure various attributes of the connection such as voltage, current, noise level, frequency, waveform received, and the like. The output of line sensor 315 may be directed to processor 340 to perform steps in response to changes in measured line condition. For example, if line power is interrupted, line sensor 315 may direct processor 340 (or power select 335 directly, in an alternate embodiment, details not shown) to select battery 330 rather than power supply 320. Various functions may be programmed to take various actions upon detection of changes in conditions, examples of which are detailed further below. Various embodiments detailed herein may be adapted to allow for transmission of any of the parameters associated with the line 110 or 120, such as those measured by line sensor 315, to one or more remote devices.

Network interface 325 is deployed to receive network 110 or 120, and may be used to transmit on or receive data from those networks, respectively, when applicable. Thus, network interface 325 provides a wired interface to an external network, when available. In this example, for clarity, network interface 325 is shown connected to processor 340 directly. In an alternate embodiment, network interface may direct traffic to or receive traffic from alternate components (details not shown). In an alternate embodiment, an additional wired data connection may be deployed, in addition to a wired connection through plug 132 or 134. Network interface 325 may be configured to support multiple connections, or multiple network interfaces may be deployed.

Switch 370 is shown connected to processor 340 and may be used for various purposes, known in the art. For example, a user may depress a button as an input means for performing various functions. Switch 370 may be used to activate or deactivate the network appliance, and may be used for alternate functions during various operational phases of the device. For example, a message may be transmitted to a remote device (i.e. a server) upon switch activation. In an alternate embodiment, more than one switch may be deployed, with each switch deployed for differing functions.

Any number of WLAN interfaces may be deployed within the scope of the present invention. A WLAN interface may comprise one or more transceivers for receiving and transmitting according to one or more communication formats. A transceiver may include one or more receivers and/or one or more transmitters (details not shown). A WLAN interface may be operable to transmit and/or receive according to one or more communication formats. Components may be shared between two or more WLAN interfaces for receiving and/or transmitting. Communication formats may be deployed on varying frequencies, which may be selectable. In this example, WLAN interfaces 380A-N are shown connected to processor 340.

Signals may be transmitted via one or more antennas 390. Transmitted signals may be formatted according to one or more system standards, including various examples detailed herein. Signals may be transmitted on one or more frequencies (which may be selectable), or may be transmitted on multiple frequencies simultaneously (i.e. in Orthogonal Frequency Division Multiplexing (OFDM) systems. A data source provides data for transmission. The data source may be any type of data source or application, examples of which are well known in the art. Examples of components that may be included in a transceiver (or transmitter) are amplifiers, filters, digital-to-analog (D/A) converters, radio frequency (RF) converters, and the like. A transceiver or transmitter may also comprise modulators, spreaders, encoders, interleavers, equalizers and other functions. Data and/or control channels may be formatted for transmission in accordance with a variety of formats. RF transmission techniques are well known in the art and may include amplification, filtering, upconversion, mixing, duplexing, etc. Infrared formats (i.e. IrDA) or other optical formats may require additional components for transmitting optical signals. Various components may be configured to support a single communication format, or may be configurable to support multiple formats. Those of skill in the art will recognize myriad combinations of transmission components to support one or more communication formats in a plug-in network appliance in light of the teaching herein.

A WLAN interface or transceiver may also include one or more receivers. A receiver performs processing according to one or more wireless system standards, such as those listed herein. A receiver may perform various processing such as Radio Frequency (RF) to baseband conversion, amplification, analog to digital conversion, filtering, and the like. Various techniques for receiving are known in the art. A receiver may receive at various frequencies, which may be programmable (i.e. by processor 340). A receiver may also include other components, such as demodulators, deinterleavers, decoders, equalizers, RAKE receivers, combiners, and the like. The format of the received signal may be used to determine the appropriate receiver design. Data and control channels may be received. Demodulated, deinterleaved, and decoded data may be delivered to a data sink, which may be any type of application, various examples of which are well known in the art, and certain examples are detailed herein. Infrared formats (i.e. IrDA) or other optical formats may require additional components for receiving optical signals. Various components may be configured to support a single communication format, or may be configurable to support multiple formats. Those of skill in the art will recognize myriad combinations of receiver components to support one or more communication formats in a plug-in network appliance in light of the teaching herein.

The WLAN interfaces may each have their own antenna 390, may be connected to multiple antennas 390, and/or one or more WLAN interfaces may share antennas with one or more other WLAN interfaces. Optical systems may comprise alternative and/or additional components to antennas 390 to receive and/or transmit optical signals. Time-sharing techniques may be deployed for performing full-duplex or half-duplex communications according to one communication format, as well as for alternating between multiple communication formats. Antennas 390 may include directional antennas, omni-directional antennas, antennas with configurable direction, and any combination thereof. Diversity techniques (i.e. selection diversity, or weighted combining) as well as spatial processing techniques, known in the art, may be deployed with multiple antenna embodiments.

The various receiving and transmitting components of WLAN interfaces 380, along with other components, such as processor 340, may be used to detect, monitor, and characterize various available networks. When multiple networks are available for transmission or reception, the network characterized as optimal or best in the given context may be selected for use. This technique may be adapted for use in any of the various embodiments detailed herein.

Processor 340 is connected to Random Access Memory (RAM) 350, which may be used for running various instructions for functions, including those detailed herein, and various others well known in the art. Non-volatile memory 355 may include flash memory, Electronic Erasable Programmable Read Only Memory (EEPROM), FlashRAM, Read Only Memory (ROM) or any other non-volatile memory. Non-volatile memory 355 may be used for storing firmware as well as other parameters and variables. Any type of memory configuration, techniques of which are well known in the art, may be deployed.

Processor 340 may be a general-purpose microprocessor, a digital signal processor (DSP), or a special-purpose processor. Processor 340 may be connected with special-purpose hardware to assist in various tasks (details not shown). Various applications (position based applications, for example, as well as any other type of applications) may be run on externally connected processors, such as an externally connected computer, or over a network connection; may run on an additional processor within network appliance 130 (not shown), or may run on processor 340 itself. Processor 340 is shown connected with memory, such as RAM 350 and non-volatile memory 355, which may be used for storing data as well as instructions for performing the various procedures and methods described herein. Those of skill in the art will recognize that memory may be comprised of one or more memory components of various types, that may be embedded in whole or in part within processor 340. In one embodiment, the processor 340 may be an Atmega 128, provided by Atmel of San Jose Calif., or a PIC18F8720 provided by Microchip of Chandler, Ariz.

In various embodiments, a bridge function is performed between two or more communication formats. Processor 340, in this embodiment, may serve to convert data received on one WLAN interface 380 to a format suitable for transmission on another WLAN 380. In an alternate embodiment, a discrete bridge or converter may be deployed. A converter may format data for transmission, or a WLAN interface 380 may format data for transmission. The data output from and inputted to each WLAN interface 380 is discrete or digital data, and any conversions from one data format to another may be processed in processor 340, or performed in a separate converter (not shown). Alternately, direct connections between WLAN interfaces 380 may be deployed to provide bridging. Data transmission of any type may be deployed, using any type of interface or combination of multiple interfaces. Interfaces include synchronous or asynchronous parallel or serial interfaces, examples of which are well known in the art.

Processor 340 may be used to perform encryption and/or decryption on various data either transmitted or received by network appliance 130. One or more encryption keys may be stored in memory, such as RAM 350 or non-volatile memory 355.

Processor 340 is also connected to optional visual indicators 360 and audible indicators 365, examples of which are detailed further below.

Various other components may be included in a network appliance 130. For example, a serial interface of any type (not shown) may be included to allow for local control such as programming, configuring, or debugging the network appliance itself or a device with which it can communicate. The network appliance may have various configuration parameters and/or firmware that may be updated using a serial interface (for example) or may be updated using another network interface (either wired or wireless). In the example position location system embodiment detailed below, any of the devices shown may be used to provide updates to configuration parameters and/or firmware of a network appliance, the results of which may be stored in any attached media (for example, non-volatile memory 355). In one example, a beacon signal may comprise configuration information.

Figure 4:
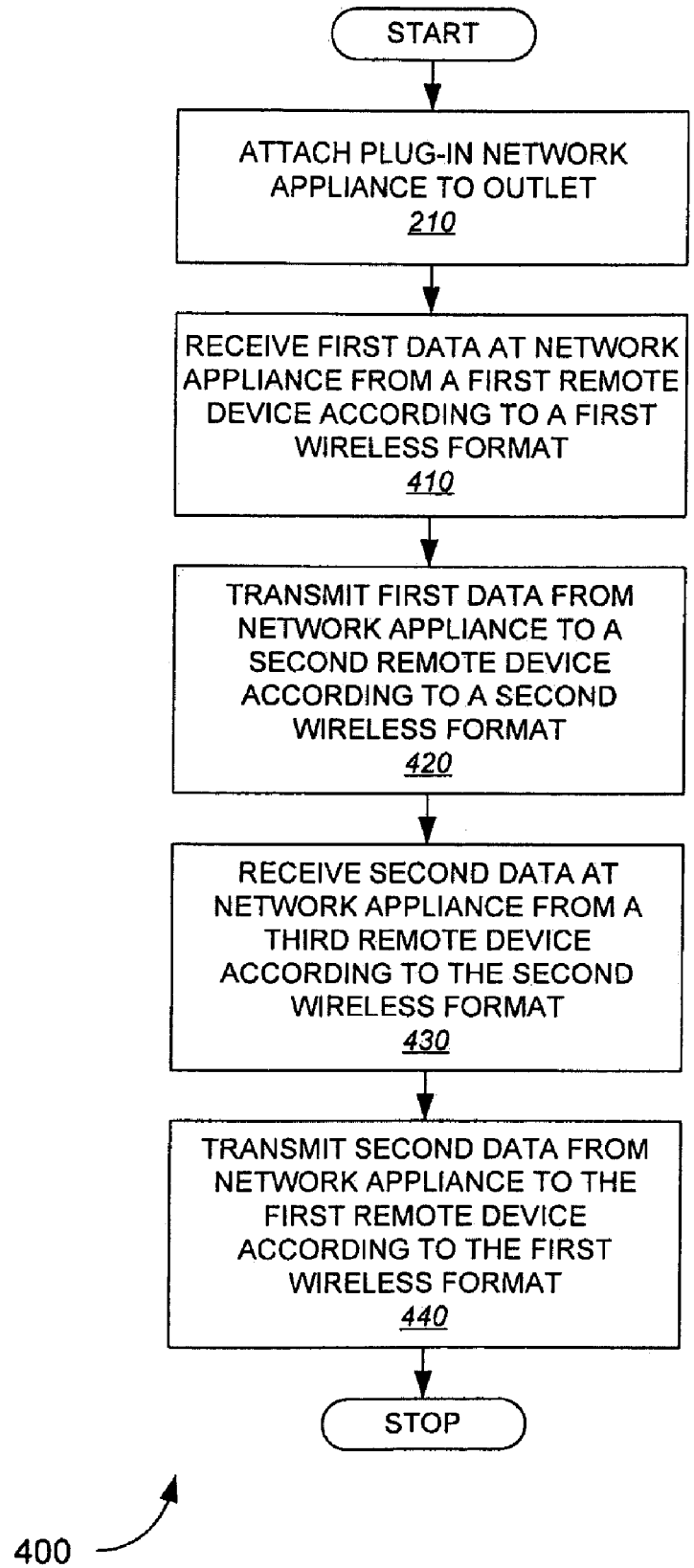
FIG. 4 depicts an example embodiment of a method for providing a network bridge in a plug-in network appliance.

FIG. 4 depicts an example embodiment of a method 400 for providing a network bridge in a plug-in network appliance. As described above, at 210, attach a network appliance to an outlet. At 410, receive data at the network appliance from a first remote device according to a first wireless format. The first remote device may include any wireless device, such as a user terminal, mobile telephone, active RFID tag, or any other device. The first wireless format may include any of the variety of communication formats detailed herein, as well as others, known in the art, or yet to be developed. At 420, transmit first data from the network appliance to a second remote device according to a second wireless format. In this example, the second remote device may also be any device such as those listed above, and the second wireless format may be any one of the above formats. In this example, the first and second wireless formats are different. Thus, a bridge from the first remote device to the second remote device has been accomplished through the plug-in network appliance. The bridge may be unidirectional, in which case the three steps described above are sufficient, or may be bi-directional including the additional steps as follows. At 430, receive second data at the network appliance from a third device according to the second wireless format. Note that the third remote device may be the same as the second device or may be any other remote device connected to the second wireless network. A third remote device is described here for generality. At 440, transmit the second data from the network appliance to the first remote device according to the first wireless format. Thus, a bridge from a first remote device to one or more wireless devices is accomplished using the plug-in network appliance, as well as a wireless bridge from one or more second or third remote devices to the first remote device.

Figure 5:
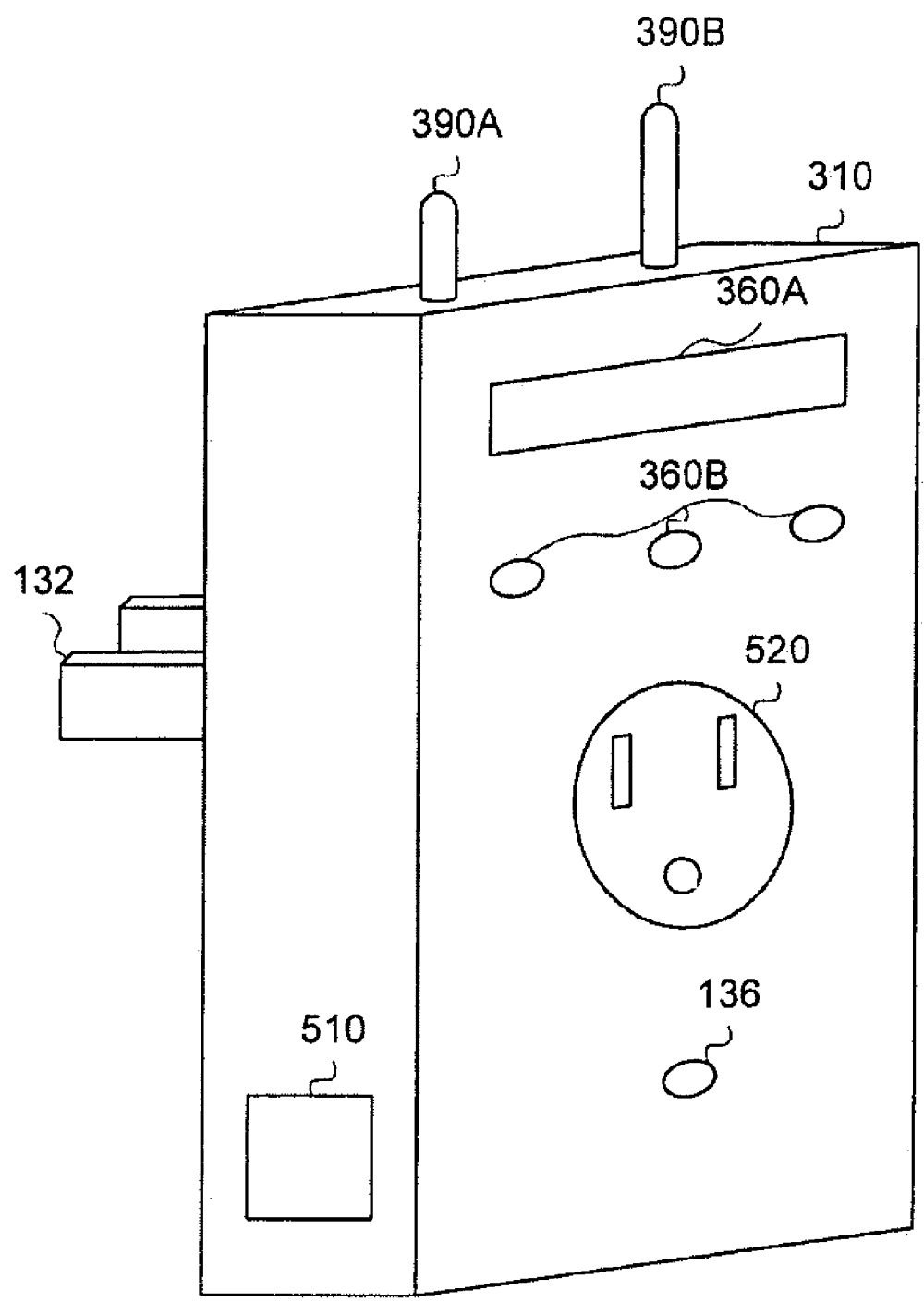
FIG. 5 depicts an example embodiment of a network appliance configured for connection to an AC power network.

FIG. 5 depicts an example embodiment of a network appliance 130 configured for connection to an AC power network. This embodiment serves to illustrate one example of various components and techniques detailed above. Those of skill in the art will recognize myriad other embodiments of a plug-in network appliance in light of the teaching herein. In this example, enclosure 310 is fixably attached to plug 132. As described above, there are myriad types of plugs and AC power standards deployed throughout the world, and those of skill in the art will readily adapt the teachings herein to these and any other plug applications.

Enclosure 310 has antennas 390A-B, shown as discrete single antennas in this example. Note that, as described above, a single antenna may be used for one wireless communication format, or multiple antennas may be used for one communication format. Additionally, one or more antennas may be shared by one or more communication formats. Enclosure 310 may be formed into any desired shape.

Display 360A illustrates one type of visual indicator 360. Display 360A may be Liquid Crystal Display (LCD). An LCD, or similar display, may be used to indicate various information, including device configuration information (e.g. Internet Protocol (IP) address or other parameters, which may be set remotely or locally), debugging information, and the like. LED lights 360B illustrate a second type of visual indicator. Example indicators that may correspond to LEDs include presence of AC power, presence of one or more wireless networks, whether or not a link to a remote device (such as a position location server, for example) is available, etc. An audible indicator 365 is not shown in FIG. 5, although one may be incorporated within or attached to enclosure 310, such as a speaker. Security attachment 136 is shown and may incorporate any of the types of security attachments 136 detailed above, or various others, as will be apparent to one of skill in the art in light of the teaching herein. Not illustrated in FIG. 3, but shown in FIG. 5, is an option to include a plug-through 520 for attaching another electrical plug through network appliance 130 to an outlet, such as outlet 150 via plug 132. Again, any type of plug interface may be deployed, along with any adaptors as necessary for differing plug standards, and multiple plug-throughs may be incorporated in a single network appliance. A button 510 is shown on enclosure 310 which may be connected to, for example, switch 370, as described above.

Figure 6:
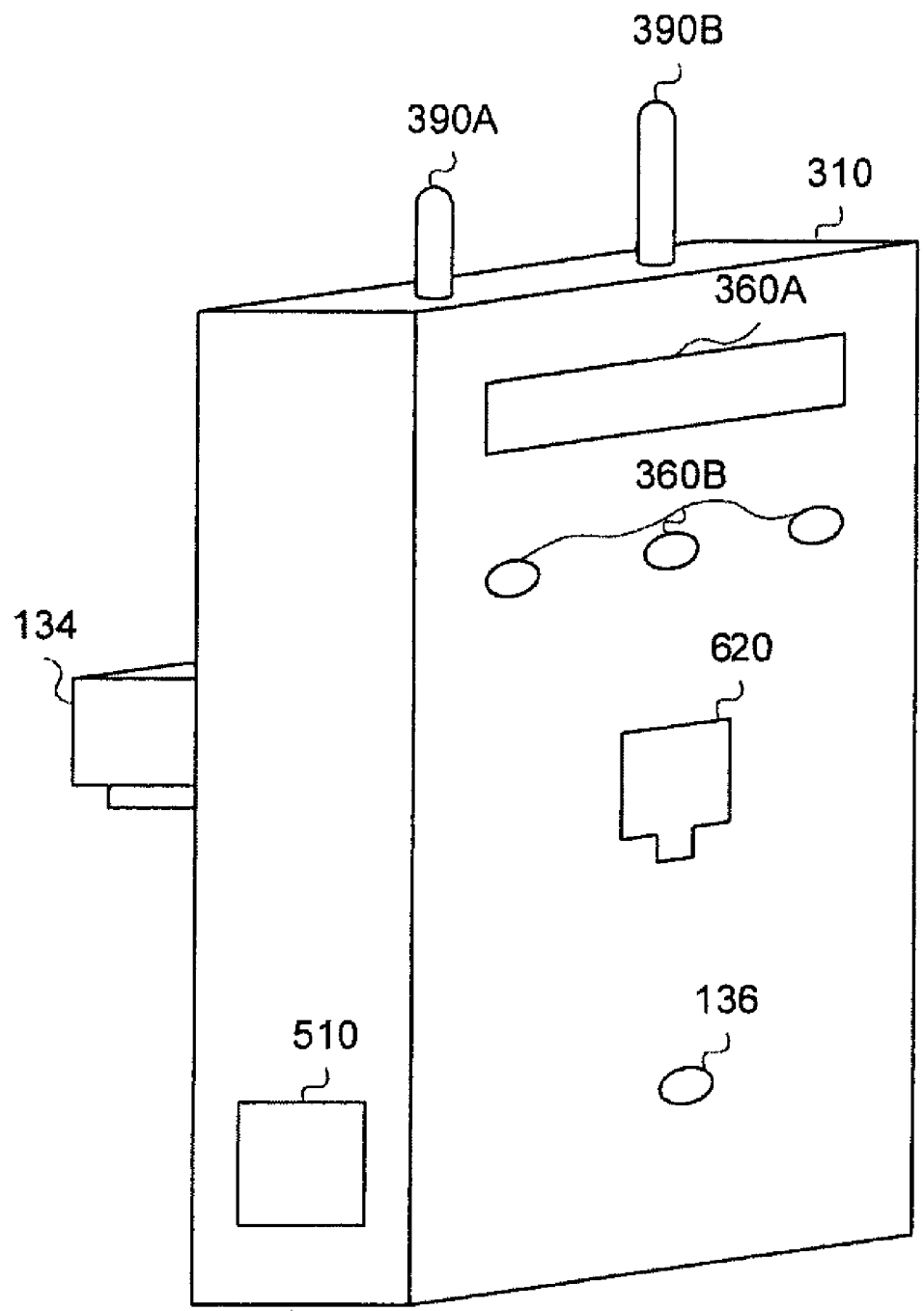
FIG. 6 depicts an alternate embodiment of a network appliance configured for connection to a network deploying, for example, RJ-45 outlets.

FIG. 6 depicts an alternate embodiment of a network appliance 130, configured for connection to a network such as one deploying RJ-45 outlets (a typical network may be configured according to the Ethernet standard). Like-numbered components may be identical to those described above with respect to FIGS. 3 and 5. In this example, an RJ-45 plug 134 is connected fixably to enclosure 310, in lieu of plug 132, as described above. As in FIG. 5, an optional plug-through 620 may be deployed for connecting an external network device. Additional plug-throughs may be incorporated, and a network appliance may also incorporate a router or switch in order to provide functionality to various plug-through connections (details not shown).

As described above, a plug-in network appliance 130 may advantageously be deployed for use in position location services. Various position location techniques are well known in the art, and network appliance 130 may be deployed for use in any such system as will be apparent to one of skill in the art. In particular, a location position scheme is detailed in the aforementioned '814 application. A summary of some of the features and some of the embodiments of a network monitor, one example of a network appliance 130, is included below. Any other network monitor function, described in the co-pending application, as well as techniques deployed in alternate position location systems, examples of which are given below, may be used in a plug-in wireless appliance, as described herein.

In one example position location system embodiment, a model of an environment in which an object is to be located is maintained. The environment comprises a physically mappable space. One or more sensors may be deployed throughout the space to monitor the environment (i.e. position location information) and provide feedback to what may be referred to as a "positioning engine", which may be a central or distributed computing resource for receiving feedback from one or more sensors and maintaining a mapping of the environment, referred to as a "mapped space". An object to be located transmits information comprising one or more measurements to the positioning engine, which projects the object information onto the mapped space and determines the object's location therefrom.

Figure 7:
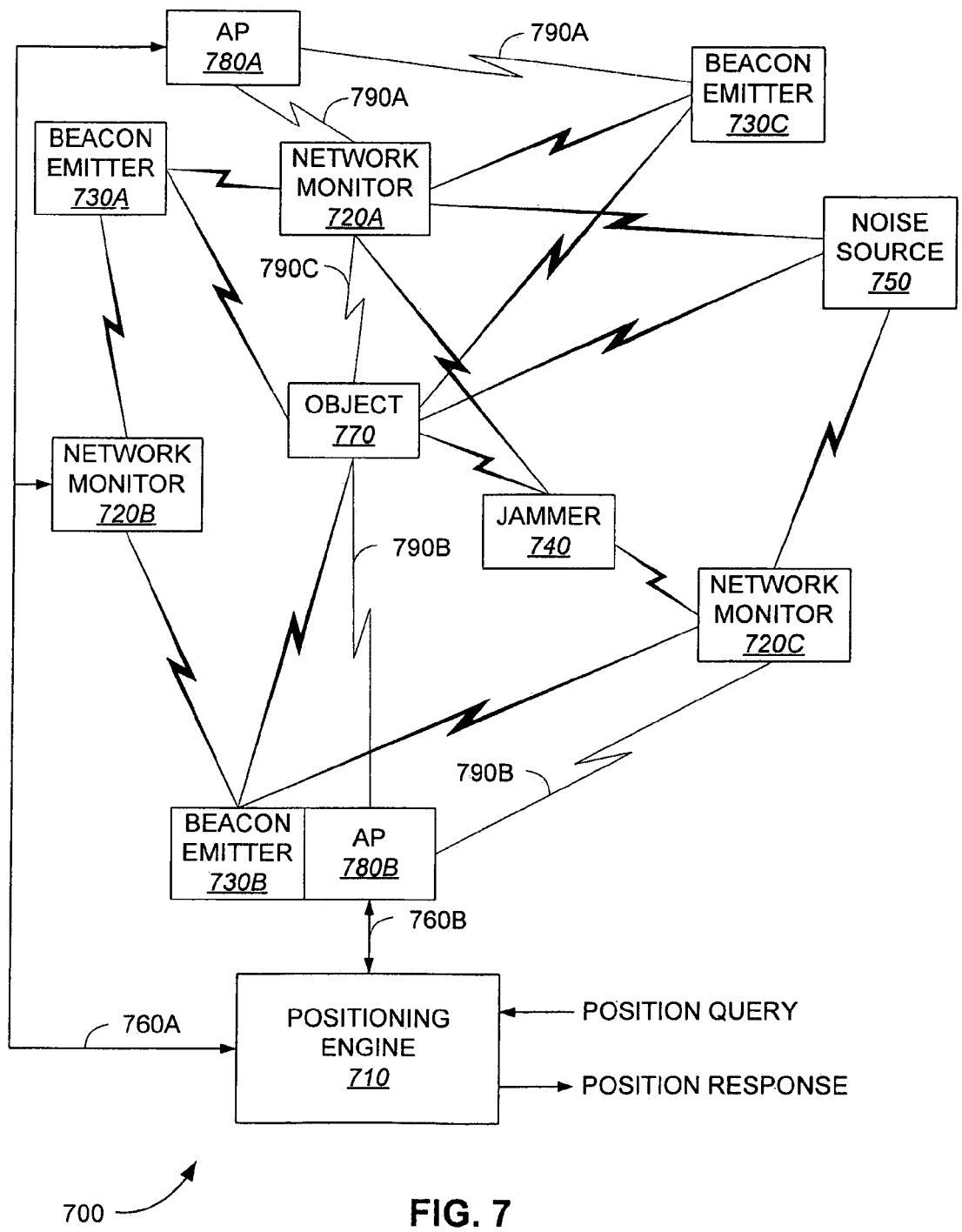
FIG. 7 depicts a system for position location of various devices within the system.

FIG. 7 depicts system 700 for position location of various devices within the system. In this example embodiment, object 770 provides information allowing its location to be determined within an area of a facility covered by system 700. Positioning engine 710, detailed further below, may be used for determining the position of and tracking of one or more objects 770 within the system. Position engine 710 is an example of a server 195, detailed above with respect to FIG. 1.

Positioning engine 710 may receive a position query from an external application, or an end user. In response to a position query, positioning engine 710 provides a position response. The position response may include various information, such as the coordinates of the object, which may be two-dimensional, in which case an (X, Y) position may be returned, or a three-dimensional position (X, Y, Z) may be returned. In addition, other parameters, such as a confidence level for a position (or area within which a position is expected), may be returned. Various other types of position responses may be returned.

In the example embodiment, object 770 may be any object or asset for which tracking is desired. Object 770 is one example embodiment of a wireless device 140, detailed above with respect to FIG. 1. An object 770 may also be referred to herein as a mobile device, tag, user terminal, or other terms. A tag may be a device that is attached to the object for which tracking is desired, example embodiments of which are detailed below. In an alternative embodiment, object 770 may incorporate the circuitry required to perform wireless tracking, as described herein. Object 770 receives wireless signals transmitted from various beacon emitters 730. A plurality of beacon emitters 730 may be deployed for generating beacons, or more generically as source signals, throughout some or all of the environment. In an alternate embodiment, an object 770, such as a tag, may be placed at a known location, and transmissions from that tag may be used as beacon signals for reception by other tags, network monitors, access points, and any other device within the system. Object 770, after receiving and measuring characteristics of the received beacon signals, and optionally measuring other environment parameters, transmits the measurements to positioning engine 710 via one of a variety of connections. In this example, object 770 communicates with Access Point (AP) 780B over wireless link 790B. Access points are well known in the art. In the example embodiment, an IEEE 802.11 Wireless Local Access Network (WLAN) may be deployed. Example WLANs include IEEE standards 802.11 (802.11a-g, for example), IEEE 802.15.4, and derivatives thereof. Any other wireless communications standard or specification may also be deployed. Examples include the cellular-based data systems, and others, referenced above.

Access point 780B communicates with positioning engine 710 over network connection 760B. It will be clear to those of skill in the art that any number of wireless and wired networks may be deployed, consistent with the principles disclosed herein. In this example, positioning engine 710 communicates over two wired networks, 760A and 760B. Wireless network 760A connects the positioning engine 710 with access point 780A, as well as a network monitor 720B.

Network monitors 720, also referred to as conditioners, calibrators, or sensors, may be deployed throughout the facility covered by system 700 to monitor and measure various environmental parameters associated with the network. The sensors 720 may measure one or more attributes of the signal (which may be any type of signal, including but not limited to an RF signal). A network monitor 720 is an example embodiment of network appliance 130.

The plurality of sensors 720 may measure the surrounding physical environment and report to the positioning engine 710 any number of measurements, including temperature, humidity, signal characteristics of beacon emitters 730 and/or other noise or signal sources, etc. The feedback may be provided over time, such that characterization of the environment, correlated with one or more measurements, may be determined. For example, the effects of the reception of one or more beacons may be characterized as a function of temperature, humidity, or both. The feedback may be provided over any network or combination of networks, such as network 760 or 790.

In an alternative embodiment, the environment may inherently contain one or more signal sources that the sensors may measure and send to the positioning engine 710. These inherent signal sources may change over time, and may or may not be designed for providing the signal for measurement. A source may be another communication system or device not associated with the location system, or it may be have no deliberate communication function, i.e. it may be a noise source 750 or what would otherwise be characterized as a jammer signal 740.

A network monitor 720 delivers the measurements to positioning engine 710 over any type of network (i.e. wireless or wired networks). A network monitor is one type of sensor. In this example network monitor 720B communicates with positioning engine 710 on wired network 760A. Note that network monitor 720C communicates with access point 780B over wireless link 790B. Network monitor 720A communicates with access point 780A over wireless link 790A. The wireless links depicted need not conform to identical communication standards (i.e., one may be an 802.11 standard, while another may conform to another standard or specification, such as a cellular data or other wireless data connection). In particular, network monitor 720A may communicate with object 770 over wireless link 790C, which may be a different format than wireless link 790A. Thus, network monitor 720A may bridge data traffic between object 770 and any device connected with network 160A.

Another example wireless LAN is the IEEE 802.15.4 standard, which may be deployed in a mobile device for communication using lower power. In one embodiment, a low power 802.15.4 radio link may be used to communicate between objects 770, while simultaneous communication links with 802.11 access points may also be supported.

In one embodiment, illustrated with network monitor 720A, described above and detailed further below, an object 770 may communicate directly with a network monitor 720 over a wireless link. In such an example the wireless link between the object 770 and the network monitor 720 may be a low power link, such as an 802.15.4 link, while the network monitor 720 communicates with an access point 780, for ultimate communication with position engine 710, over another wired or wireless link.

Also shown in FIG. 7 is a wireless link 790A between access point 780A and beacon emitter 730C. In one embodiment, a beacon emitter may be programmable, so as to configure the type of beacon signal transmitted. A beacon emitter may also be configured to send any other information that may be desirable to transmit or broadcast along with the beacon signal. This may be accomplished through a wired or wireless connection to a beacon emitter. For example, beacon emitter 730B is shown connected with access point 780B and is connected to positioning engine 710 with wired network link 760B. Note that beacon emitter 730A is not connected to positioning engine 710 through any network connection. This illustrates an example of a beacon emitter that is preconfigured to transmit a beacon signal and does not need to be configurable while operating within the system.

The combination of beacon emitter 730B and access point 780B identifies another aspect. An access point 780 may be used as a beacon emitter. For example, an 802.11 access point transmits a known periodic signal, which may be used for measurement by an object 770 as well as sensors 720 within the network. It is also possible to combine beacon emitters with network monitors, and a network monitor may also be combined with an access point. Various alternative embodiments are detailed further below.

Note also that jammer 740 is shown in system 700. In some context, a jammer or noise source, such as noise source 750, may also produce an identifiable signature that may be measured by sensors and objects within the network. In this example, object 770 receives and measures signals from noise source 750 and jammer 740. Network monitors 720A and 720C also receive noise source 750 as well as the signal from jammer 740. This information may be transmitted to positioning engine 710 for use in position location.

Positioning engine 710 may also associate various measurements with other parameters, such as time of day, day or week, etc. Measurements may also be averaged over time. Sequences of measurements may be stored over a certain period and transmitted in bulk as desired.

In the example embodiment depicted in FIG. 7, the various sensors and/or network monitors may periodically measure environment conditions within the system at any rate desired. Thus, positioning engine 710 is periodically updated with refreshed data that may vary according to change in environment conditions. Other measurements of environment variables, such as temperature, humidity, time, etc., may be transmitted along with the measurements to allow for correlation of measurements associated with those indexing parameters. Thus, when an object 770 is tracked or located within the system, the measurements received from the object may be used to determine a location in accordance with an updated or current measurement of the environment. In a broad conception, positioning engine 710 maintains a model of the environment (or mapped space) in which an object is to be located.

An object 770, within the mappable three-dimensional space, makes measurements from one or more beacon emitters 730, or other sources, such as noise source 750 or jammer 740. Upon some triggering event, i.e. motion, sensor input, timer expiration, direction from a controlling device (such as a positioning engine 710), or a condition being met in accordance with one or more parameters (which may be pre-defined, or updated and transmitted to the object 770), the object 770 may transmit the measurement information across a network. The object 770 may also transmit information about the triggering event across a network. Note that, in an alternate embodiment, an alternate communication link may be deployed to communicate with one or more objects 770 (as described above). Thus, the object feedback network may be separate from the network 760 on which the sensors 720 provide feedback. Note further that the beacon emitters may be connected on a network, which may be connected to a controlling device (i.e. positioning engine 710, or some other device, details not shown). The beacon emitter's network may be a wireless network that may be used in whole or in part to provide the signal for monitoring and measurement by sensors 720 and objects 770. Alternatively, the beacon emitter's network may be separate. In an example embodiment, a Wireless Local Area Network (WLAN), such as an IEEE 802.11 network, is deployed and shared for communication with beacon emitters 730, sensors 720, objects 770, and positioning engine 710. Various other communication data, not used for location services, may also be transported on one or more of the above referenced networks (details not shown).

To determine the location of devices 770 in any given facility, the radio frequency (RF) environment in the facility may be measured. During this calibration procedure, one or more network monitors are placed at known locations in the facility. RF data from each device is measured and transmitted to positioning engine 710 (also referred to as a Location Positioning Engine (LPE)). A network monitor is also referred to as a conditioner, sensor, calibrator, or calibration device. The RF data is recorded along with the actual location of the network monitor to produce an RF data map of the environment. Such a data map is one example of a mapped space.

RF data measured by the network monitor 720 may include signal strength from beacon emitters 130, (which may be emitted by access points 780), signal strength of data from other mobile devices 770, ambient radio frequency noise in the environment (including a plurality of different frequencies), environmental information, (which may include ambient air temperature, ambient air humidity, and other measurable parameters of the environment), and any of the above information being transmitted to the network monitor 720 from one or more mobile devices.

In one embodiment, access point beacons are used as the RF data. For example, a WLAN access point may transmit beacons at regular intervals (e.g. 100 ms). A beacon may be a packet of data regularly transmitted by an access point in a WLAN containing WLAN configuration parameters to allow a WLAN device to communicate with the access point emitting the beacon. In an example embodiment, the network monitor 720 receives beacons from each WLAN access point 780 that is within range (i.e. any access point that the network monitor 720 can detect) for a predetermined time interval (e.g. five seconds).

In an example embodiment, a network monitor performs a statistical analysis (for example, determining the average, or variance, or other methods known in the art) on the access point beacon signal strength measurements prior to transmitting this data to the positioning engine via the WLAN. The known location of the network monitor is associated with the received data and stored in the positioning engine, thus creating an RF data map of the environment. Any technique may be used for entering the known location data into the positioning engine and associating the resulting measurements with those data.

The calibration routine may be performed continually (either periodically, intermittently, upon certain triggering events, etc.), with the positioning engine receiving RF data from the network monitors and updating the RF data map whenever new data is received. In an alternate embodiment, the RF data map consists of data points measured once (or infrequently) as well as data points that are continually adjusted.

When the RF data is received from a network monitor, the positioning engine may perform a statistical analysis (for example, determining the average, or variance, or other methods known in the art) on the received data to determine the quality of each datum. This information may be stored along with the RF data and may be used when computing location.

In an example embodiment, the system 700 is installed in a facility with a wireless local area network (WLAN) 790 using the IEEE 802.11g standard. This WLAN consists of one or more Access Points (APs) 180 connected to a Location Positioning Engine (LPE) 710. This facility (for example a hospital with several floors) also has several network monitors 720 plugged into wall outlets. Most network monitors are located on the perimeter of the facility. There is approximately one network monitor for every one thousand square feet of the facility. The location of each network monitor is stationary and known to the system. For example, a network monitor may be located at a wall power outlet. This facility also has many tags 770 mounted on assets throughout the facility.

In this example, the APs transmit beacons periodically (for example, every 100 ms.). The network monitors regularly (e.g. once a minute) listen for these beacons, measure the signal strength from them, and transmit this information (AP identification and signal strength) to the Location Positioning Engine. The LPE builds a model of the RF environment using a Radial Basis Function, although other neural network algorithms may be employed.

In this example, some tags are configured to transmit location data when they stop moving. Other tags are configured to transmit location data on regular intervals (e.g. once per day). This configuration may be changed by a user on a remote machine. A configuration may be applied to multiple tags. When the battery on a tag falls below a predefined threshold the tag wakes up and transmits an alert message to a user. The tags also transmit alert messages when detached from assets.

Figure 8:
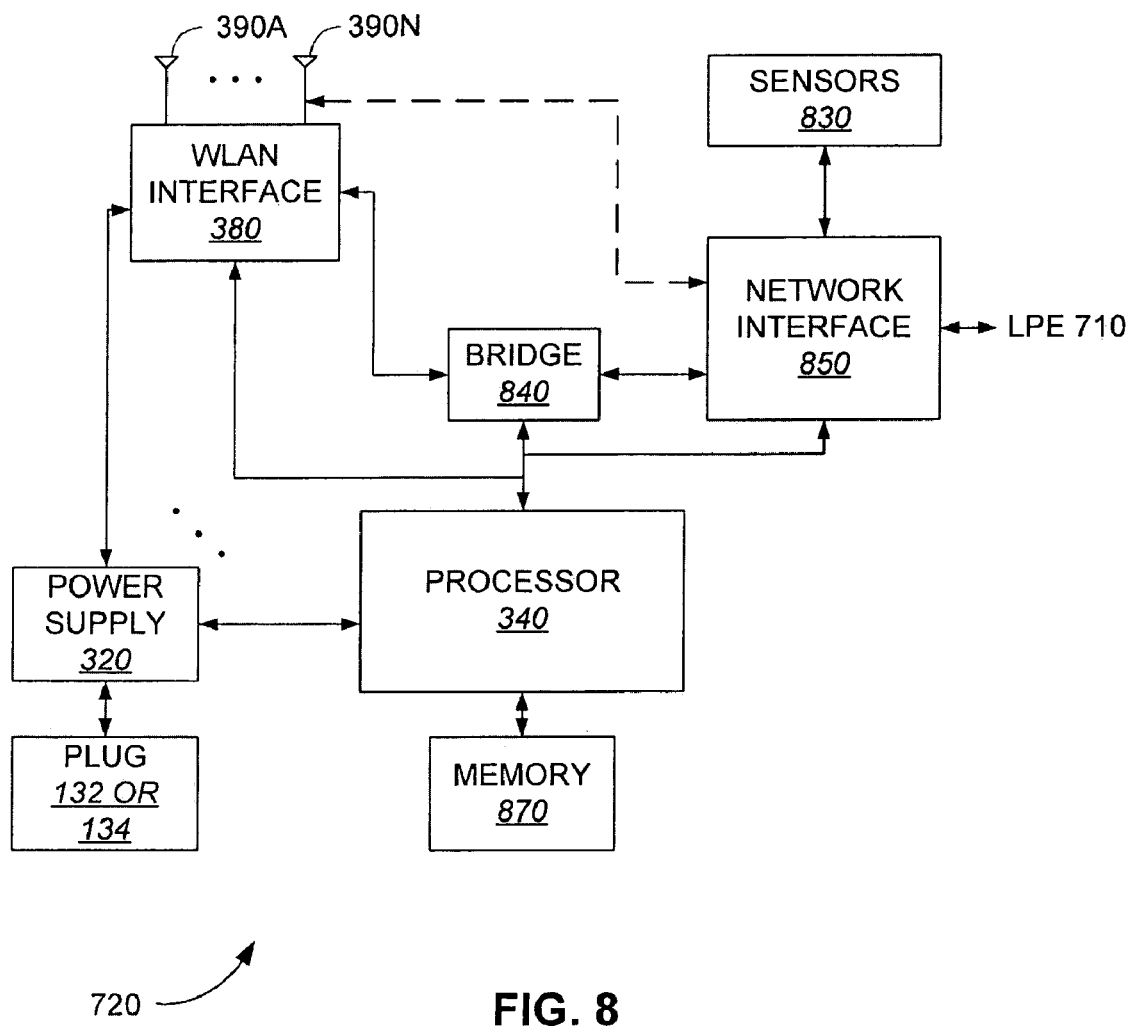
FIG. 8 depicts an example embodiment of a network monitor.

FIG. 8 depicts an example embodiment of a network monitor 720. Network monitor 720 is one example embodiment of a network appliance 130 (for example, see FIG. 3 above). Only a subset of components of a network monitor 720 is shown, for clarity. In this example, WLAN interface 380 is connected with one or more antennas 390A-N. WLAN interface 380 is used to receive and measure signals in the RF environment, primarily the signals from beacon emitters 730, but possibly also including other jammers and/or noise sources that are in the RF environment, if desired. Network interface 850 is shown connected to positioning engine 710. This network interface may be a wired or wireless connection. Network interface 850 is one example embodiment of a network interface 325, or may be an additional network connection. A dashed line connection to antennas 390 indicates that network interface 850 may use a wireless interface to communicate with positioning engine 710 as well. Antennas 390 may or may not be shared between WLAN 380 and network interface 850 in such an example (i.e., a separate antenna or set of antennas may be deployed).

Sensors 830 are shown connected to network interface 380. Sensor 830 may measure other environment variables local to the network monitor 720 such as temperature, humidity, RF noise, etc. In an alternate embodiment, sensors 830 need not be deployed. In various embodiments detailed herein, sensor measurements may be stored and/or transmitted to one or more remote devices.

Bridge 840 is deployed between WLAN interface 380 and network interface 850. This optional component may be deployed to produce a network bridge between one network and another. For example, WLAN 380 may be used to communicate with tags 770 using a wireless interface, such as 802.11, 802.15.4, or any other standard. Bridge 840 may be used to transfer traffic from mobile devices through WLAN 380 to any network connected to network interface 880, which may use an alternate network such as a wired network or an alternate wireless network. In the example embodiment, a network monitor is equipped with a connection to an external power supply. This power supply may comprise a network for communication with positioning engine 710, as described above. (In an alternate embodiment, a network monitor may comprise a battery or other local power generation source.)

Bridge 840 may use various techniques to route or store and forward data from one network to another, techniques for which are known in the art. Memory 870 processor 340, or any other component may be used to perform bridge functions, and bridge 840 need not be a separate component, but may be carried out using various functions, or a combination of both (as shown in the embodiment of FIG. 3). In one embodiment, data received on 380 is decrypted according to one network key and may be encrypted again using a different network key prior to transmitting the data on 850, and vice versa.

Processor 340 is shown connected to various devices in FIG. 8 and may direct the communication between any of the above-described devices. One or more of the functions described as being contained in a discrete component of FIG. 8 may also be performed in processor 340, such as bridging network traffic from WLAN 380 to network interface 850, performing processing for either WLAN or network interface, sensor control, or measurement computation.

Processor 340 may be a general-purpose microprocessor, a digital signal processor (DSP), or a special-purpose processor. Processor 340 may be connected with special-purpose hardware to assist in various tasks (details not shown). Various applications (position based applications, for example, as well as any other type of applications) may be run on externally connected processors, such as an externally connected computer or over a network connection, may run on an additional processor within network monitor 720 (not shown), or may run on processor 340 itself. Processor 340 is shown connected with memory 870, which may be used for storing data as well as instructions for performing the various procedures and methods described herein. Those of skill in the art will recognize that memory 870 may be comprised of one or more memory components of various types, that may be embedded in whole or in part within processor 340. In one embodiment, memory 870 may incorporate RAM 350 and/or non-volatile memory 355, detailed above.

Note that WLAN 380 may include multiple radios for communicating on multiple wireless interfaces. In an example embodiment, WLAN interface 380 may be used to communicate with tags 770 or other wireless devices within range, in addition to measuring the RF environment. In an alternate embodiment, a network monitor may simply contain a measurement device for connection to antenna 390 for receiving and measuring the beacons and a network interface to transmit those measurements using WLAN interface 380 to positioning engine 710.

In an alternate embodiment, a network monitor may also measure the wireless transmissions from a tag. Such measurements may be transmitted to the location positioning engine and used in locating that tag or mobile device. For example, if a network monitor measures a strong signal from a tag (i.e., a measurement exceeding a predetermined threshold), it may be determined that the tag is located nearby the network monitor. If one or more additional network monitors measure the transmissions from the tag, the position location determination may be assisted for that tag (i.e. triangulation). This position location method may be combined with various others, examples of which are detailed further below.

The network monitor 720 depicted in FIG. 8 may be adapted to incorporate the plug-in form factor detailed above with respect to FIG. 3. Thus, a plug 132 or 134 may be attached to a power supply 320 for providing power to various components (all connections not shown). Plug 132 or 134 may be fixably attached to an enclosure 310 (not shown).

Figure 9:
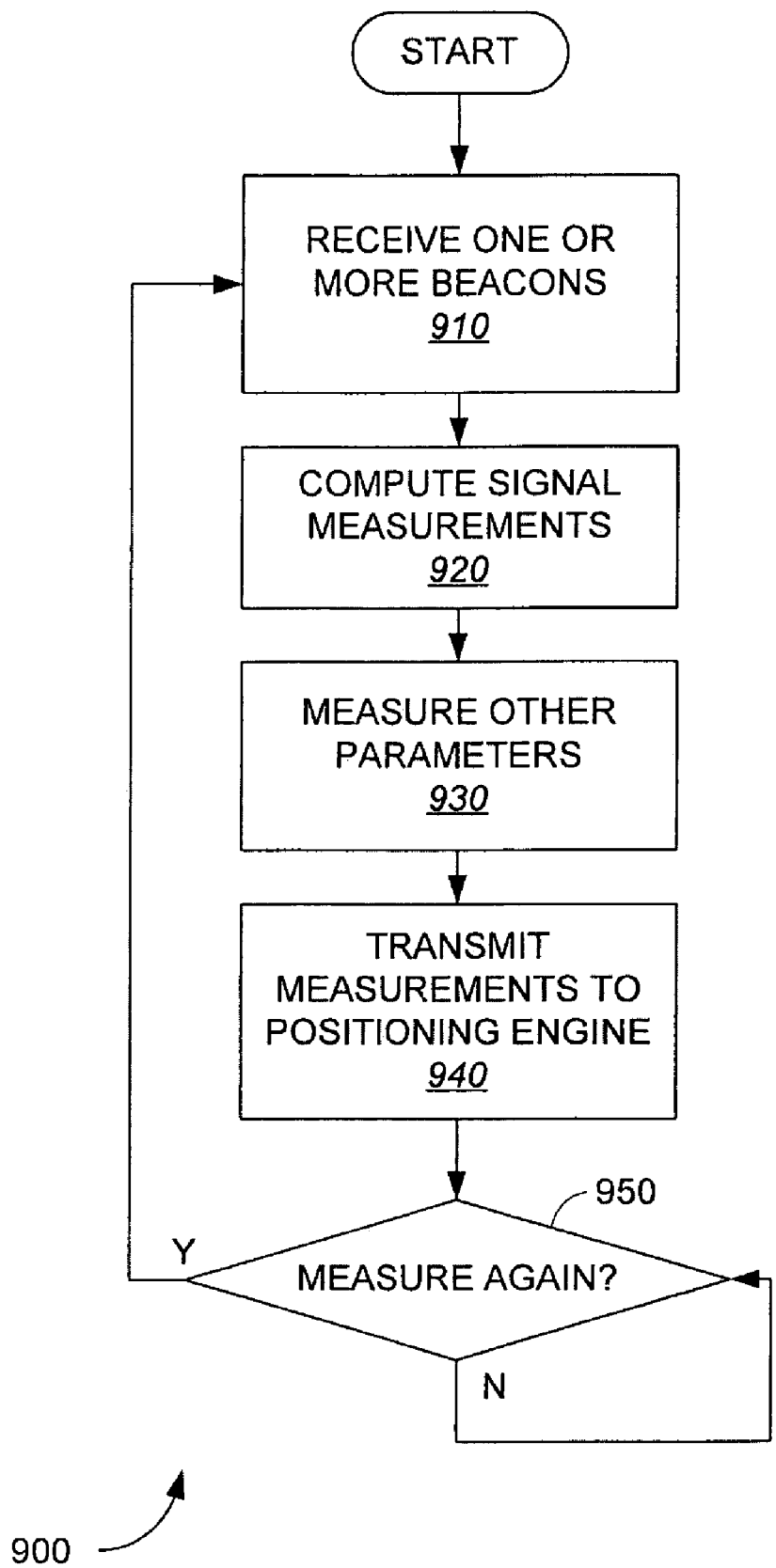
FIG. 9 depicts an example method for network monitoring.

FIG. 9 depicts an example method 900 for network monitoring. The process begins in block 910 where the network monitor receives one or more beacons. In block 920, the network monitor computes signal measurements for one or more of the beacons received. In block 930, the network monitor may optionally measure other parameters such as temperature, humidity, signal strength of wireless devices, other RF noise, etc. In block 940 the network monitor transmits one or more of these measurements to a positioning engine, such as positioning engine 710.

In decision block 950, the process may pause until it is time to measure parameters again, in which case the process repeats beginning in block 910. The measurement process may be periodic. Alternatively, measurements may be based on whether or not changes have occurred in the environment. In an alternate embodiment, not shown, a network monitor may store various measurements along with a timestamp and the measurements may be transmitted in bulk to the positioning engine as desired. Bulk transmission may also be performed periodically or may be performed based on some predetermined condition occurring in the environment, or upon request by a positioning engine.

A tag 770 may also operate as a network bridge, in similar fashion as described above with respect to the network monitor 720. For example, a tag may communicate with one or more other mobile devices over a wireless interface such as 802.15.4 or another wireless standard. The tag may then transmit or receive data on an alternate network. Thus, for example, tags that communicate according to one radio standard may use another remote tag, including one that communicates according to two or more standards, as a bridge to maintain connectivity. Data received on one link may be stored in memory before being formatted and transmitted on a second link. Those of skill in the art will recognize these and myriad other combinations of radio communication links that may be deployed within the scope of the present invention.

An example embodiment of an access point includes any device for communication with the positioning engine and/or one or more wireless communication devices within system 700. As described above, the access point may communicate with the positioning engine via wired or wireless connection. It may also support other wired or wireless connections to other devices within the network or within the system. In one embodiment, an example access point is configured to receive measurements wirelessly from mobile devices 770. In an alternate embodiment, an access point may receive measurements via a network monitor deployed in the system, either through a wired connection, or wirelessly. Those of skill in the art will recognize the myriad connections that may be deployed in light of the teaching herein.

An access point may have multiple interfaces to connect with various types of tags, each tag supporting one or more of various radio interfaces. An access point may be connected to the position location engine over a network or may be connected directly to the positioning engine. As described above, an access point may be co-located with or include the functionality of a network monitor or a beacon emitter.

Figure 10:
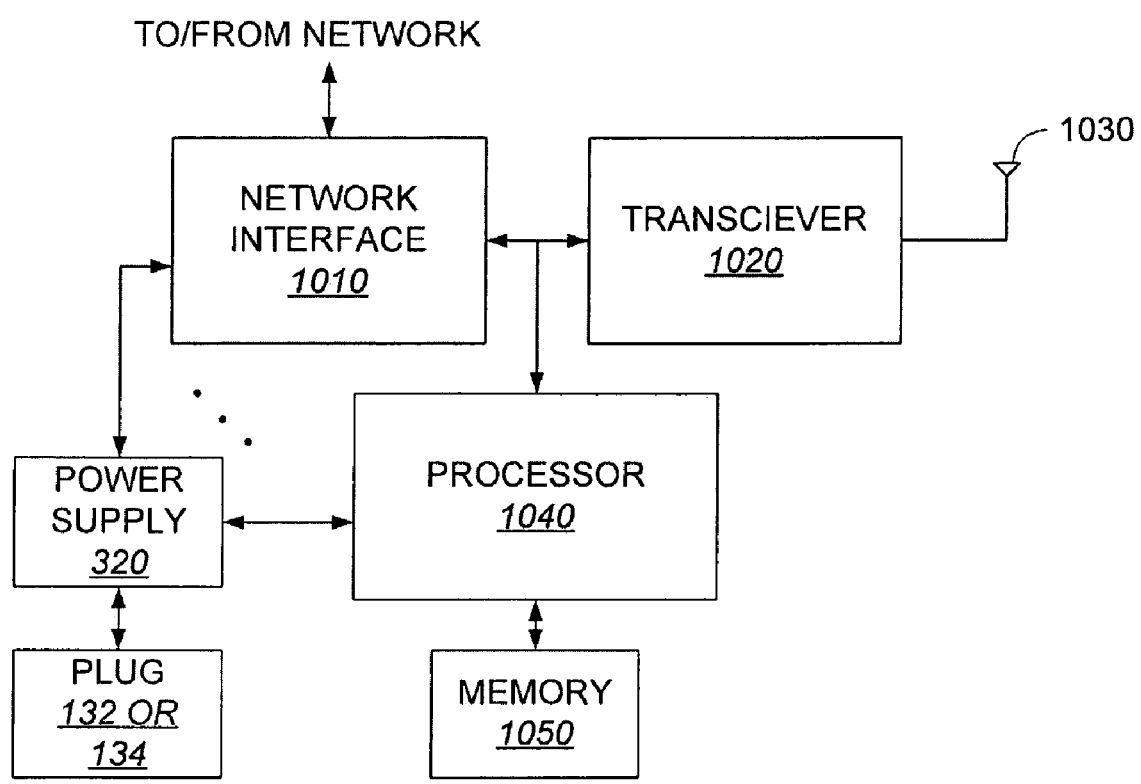
FIG. 10 depicts an example embodiment of an access point.

FIG. 10 depicts an example embodiment of an access point 780. Access point 780 is an example of a network appliance 130, detailed above. Access point 780 may also incorporate a network monitor 720 (in whole or in part, details not shown). Network interface 1010 is connected with a network. In this example, the network is the communication medium for receiving from and transmitting to the positioning engine, or a network for which a network bridge is to be performed. Data to and from the network may be transmitted via antenna 1030 by transceiver 1020. Transceiver 1020 is equipped to receive and/or transmit according to one or more communication standards. In one embodiment, the transceiver operates in accordance with an 802.11 specification. In an alternate embodiment, one or more additional transceivers may be deployed to support alternate communication standards. Processor 1040 is connected to memory 1050.

Processor 1040 may be a general-purpose microprocessor, a digital signal processor (DSP), or a special-purpose processor. Processor 1040 may be connected with special-purpose hardware to assist in various tasks (details not shown). Various applications (position based applications, for example, as well as any other type of applications) may be run on externally connected processors, such as an externally connected computer or over a network connection, may run on an additional processor within access point 780 (not shown), or may run on processor 1040 itself. Processor 1040 is shown connected with memory 1050, which may be used for storing data as well as instructions for performing the various procedures and methods described herein. Those of skill in the art will recognize that memory 1050 may be comprised of one or more memory components of various types, that may be embedded in whole or in part within processor 1040. One or more of the functions of transceiver 1020 and/or a network interface 1010, may be carried out in processor 1040 as well.

The access point 780 depicted in FIG. 10 may be adapted in similar fashion as described above with respect to FIG. 8. In particular, access point 780 may be adapted to incorporate the plug-in form factor detailed above with respect to FIG. 3. Thus, a plug 132 or 134 may be attached to a power supply 320 for providing power to various components (all connections not shown). Plug 132 or 134 may be fixably attached to an enclosure 310 (not shown).

Figure 11:
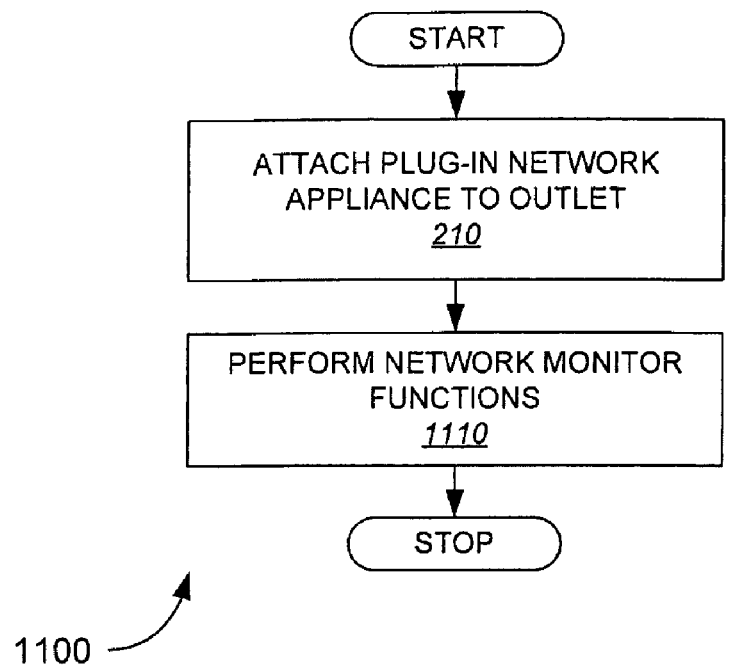
FIG. 11 depicts an example embodiment of a method for performing network monitor functions with a plug-in network appliance.

FIG. 11 depicts an example embodiment of a method 1100 for performing network monitor functions with a plug-in network appliance. At 210, as described above, attach a plug-in network appliance to an outlet. At 1110, perform network monitor functions with the plug-in network appliance, using power from the attached outlet. As before, a wired data connection through the attached outlet may optionally also be used. Any network monitor function, examples of which are detailed above, and further below, may be performed at 1110. In this embodiment, the network appliance functions as a network monitor. The network appliance may optionally perform various other functions as well. For example, a network appliance may combine network monitor functions as well as access point functions, among others.

Figure 12:
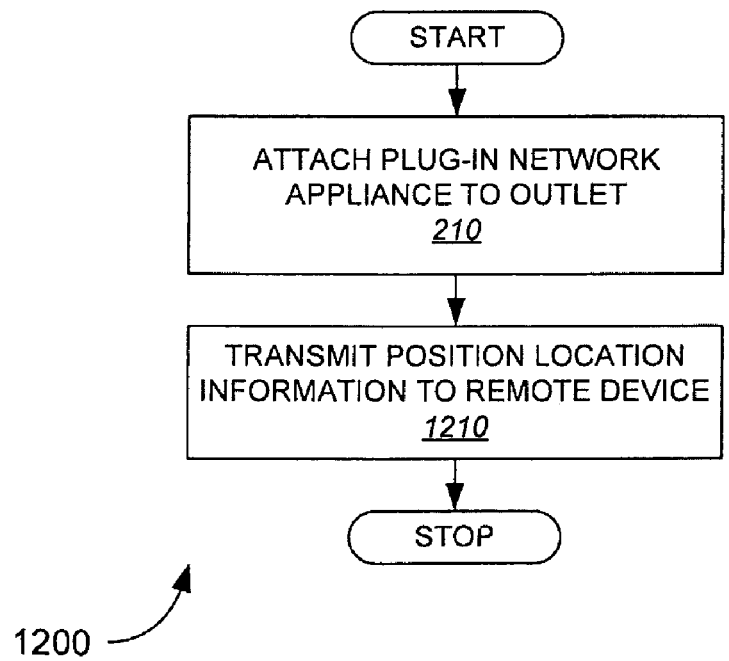
FIG. 12 depicts an example embodiment of a method for transmitting position location information.

FIG. 12 depicts an example embodiment of a method 1200 for transmitting position location information. Again, at 210, as before, attach the plug-in network appliance to an outlet. At 1210, transmit position location information from the network appliance to a remote device. Various embodiments may be deployed. For example, as described above, a network monitor function may be incorporated in a network appliance. Thus, the network appliance may measure one or more system environment parameters, such as received signal strength from one or more beacons. These measurements may comprise a portion of the position location information for transmission. Transmission position-information may also be received at the network appliance from one or more other devices in the system, such as tags or other mobile devices for which position location information is computed. Position location information is not limited to measurements of received signal strength. Any other position information generated may also be transmitted. Position location information such as that described above with respect to FIGS. 7-10 may be used.

In addition, a plug-in network appliance may be used to transmit any other position location information known in the art. One example is the Radar system. (See P. Bahl and V. N. Padmanabhan, "Radar: An In-Building RF-based User Location and Tracking System", in Proceedings of the IEEE Infocom 2000, Tel-Aviv, Israel, vol. 2, March 2000, pp. 775-784, expressly incorporated by reference herein). Such systems employ RF fingerprinting, whereby mobile devices measure signal strength from one or more beacons and attempt to correlate those measurements with signature measurements taken throughout the defined area. These measurements may constitute position location information in one embodiment.

Radio Frequency Identification (RFID) systems have been and are being developed to track and locate items within defined areas. Passive RFID systems are limited to detecting the presence of an item within range of a portal. Typically, a portal or interrogator sends out a query signal and any tag (i.e., a device included in or attached to an object to be tracked) within range responds. Passive RFID tags generally do not have a power source. Active RFID systems function in a similar manner, but the active tags have a power source, typically a battery, for longer-range operation. RFID systems (active and passive) may require installing a dedicated infrastructure of portals or interrogators for tracking which may be difficult or expensive to deploy, and may lack flexibility. RFID portal and/or interrogator functions may be deployed in a network appliance 130. The results of interrogation of passive RFID tags, or the reception from an active ID tag may also constitute position location information in one embodiment.

Other systems employ triangulation, whereby fixed devices measure the signal strength or propagation delay of a mobile device and use this information in conjunction with the known location of the fixed device to compute the location of the mobile device. These systems generally require installing a dedicated infrastructure of fixed devices for tracking, which may be difficult or expensive to deploy, and may lack flexibility. As described above, network appliances 130 may be used for triangulation. This information is an alternate example of position location information. A plug-in network appliance may facilitate deployment of such systems in a more convenient and/or cost effective manner. For example, a plurality of plug-in network appliances may be deployed to measure received signal strength from a tag, and generate position location information comprising the plurality of received signal strength measurements. The position location information may then be delivered to a position engine for triangulation. (Position location techniques, such as triangulation, may also be combined with others to determine a final location.)

In another embodiment, Time of Flight (ToF) between the mobile device and a plurality of network monitors may be used to determine the location of the mobile device. Several methods to determine ToF are described herein. The location positioning engine may compute the location of the mobile device using the ToF between the mobile device and the network monitor in conjunction with the known location of the network monitor. In one embodiment, simple triangulation is used. In an example embodiment, network monitors may measure the ToF between them to create a model of the environment. ToF measurements between mobile devices and network monitors are then compared to the model to determine the location of the mobile device, as described in the '814 application. ToF measurements are another example embodiment of position location information.

One method of determining ToF uses UltraWideBand communications (UWB). Since UWB transmits on several frequencies simultaneously (i.e. a multi-frequency signal), the time of flight from the mobile device to the network monitor may be determined by the network monitor measuring the phase difference between the various frequencies in the signal received from the mobile device. This data (i.e. position location information) is then sent to the location positioning engine along with the ID of the mobile device that was measured. These, and other methods to determine ToF from UWB transmissions, are known to those skilled in the art. For example, refer to the presentation entitled "A Precision Location Network Using Ultra Wideband WLAN Radios", by G. Shreve and D. Kell as presented at the Third IEEE Workshop on Wireless Local Area Networks, Sep. 27-28, 2001 (available at URL: http://www.wlan01.wpi.edu/proceedings/wlan62d.pdf-), expressly incorporated by reference herein.

Another method to determine ToF requires all devices on the network to be synchronized to a master clock. (At any instant in time, every device has the same or nearly the same value on its clock.) This time value may be associated with a real-time clock value (e.g. 14:00:00.45) or it may be an arbitrary number (e.g. the number of microseconds since a particular time, either continuously increasing, or resetting every N periods, where N is the same for all devices). To determine ToF between a mobile device and a network monitor, a mobile device first transmits a message containing the device's ID and the current value of the clock (t1). When a network monitor receives the message, it records the value of its clock (t2). The network monitor computes the time of flight (ToF) by subtracting t2 from t1. The network monitor then transmits this ToF along with the device's ID to a server (an embodiment of position location information).

Yet another method to determine ToF employs an announcement-reply type of system. One device starts a timer while transmitting one message (the Announcement) to a second device. The second device transmits a Reply to the first device after it receives the Announcement. When the first device receives the Reply, the timer is stopped. The ToF between the two devices is equal to half of the timer value since the timer measured round-trip delay. If the second device has a delay between when it receives an announcement and when it transmits a reply, then this delay (turnaround delay) is subtracted from the timer value as well.

The remote device, in one embodiment, may be a position location engine, such as that described above, or any other position location computation device known in the art or developed in the future. The position location information may be transmitted via a wireless connection as well as through a wired connection (whether through the attached outlet or an external wired network connection). The transmitted position location may be transmitted to a position location engine through one or more intermediate devices as well.

Figure 13:
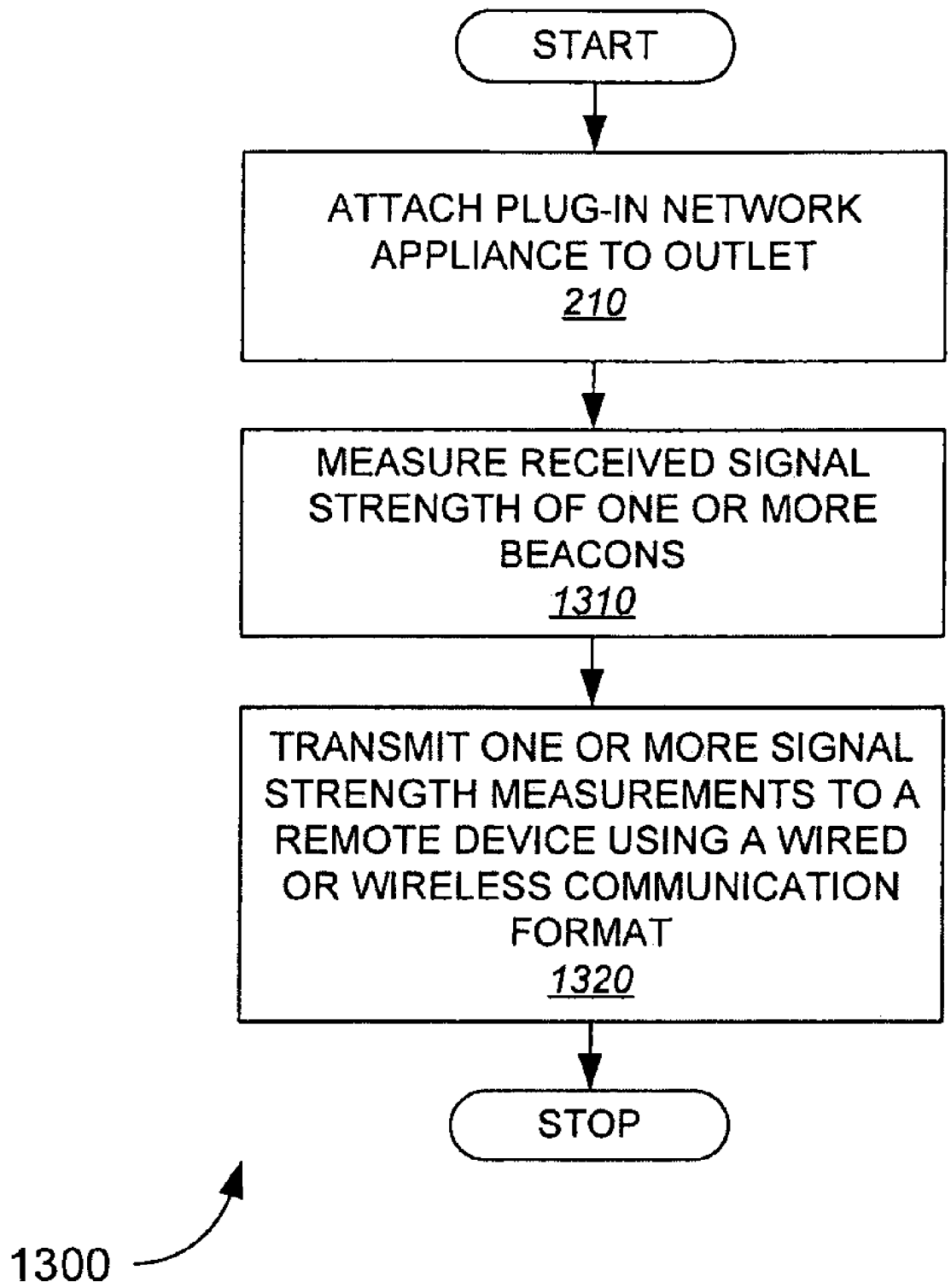
FIG. 13 depicts an example embodiment of a method for performing received signal strength measurements in a plug-in network appliance.

FIG. 13 depicts an example embodiment of a method 1300 for performing received signal strength measurements in a plug-in network appliance. As before, at 210, attach the plug-in network appliance to an outlet. At 1310, measure the received signal strength of one or more signals (examples include beacons, or signals transmitted from other devices, such as network monitors or tags). The beacons may be, in one example, signals transmitted from one or more access points, or any other signal source for which measurements may be useful, as described above. The signals may be transmitted on one or more frequencies. In an alternate embodiment, noise may be measured on one or more frequencies. At 1320, transmit one or more signal strength measurements to a remote device, as described above with respect to FIG. 12, using a wired or wireless communication format on a wired or wireless network, respectively. The measurement values may be stored in memory before transmission.

Figure 14:
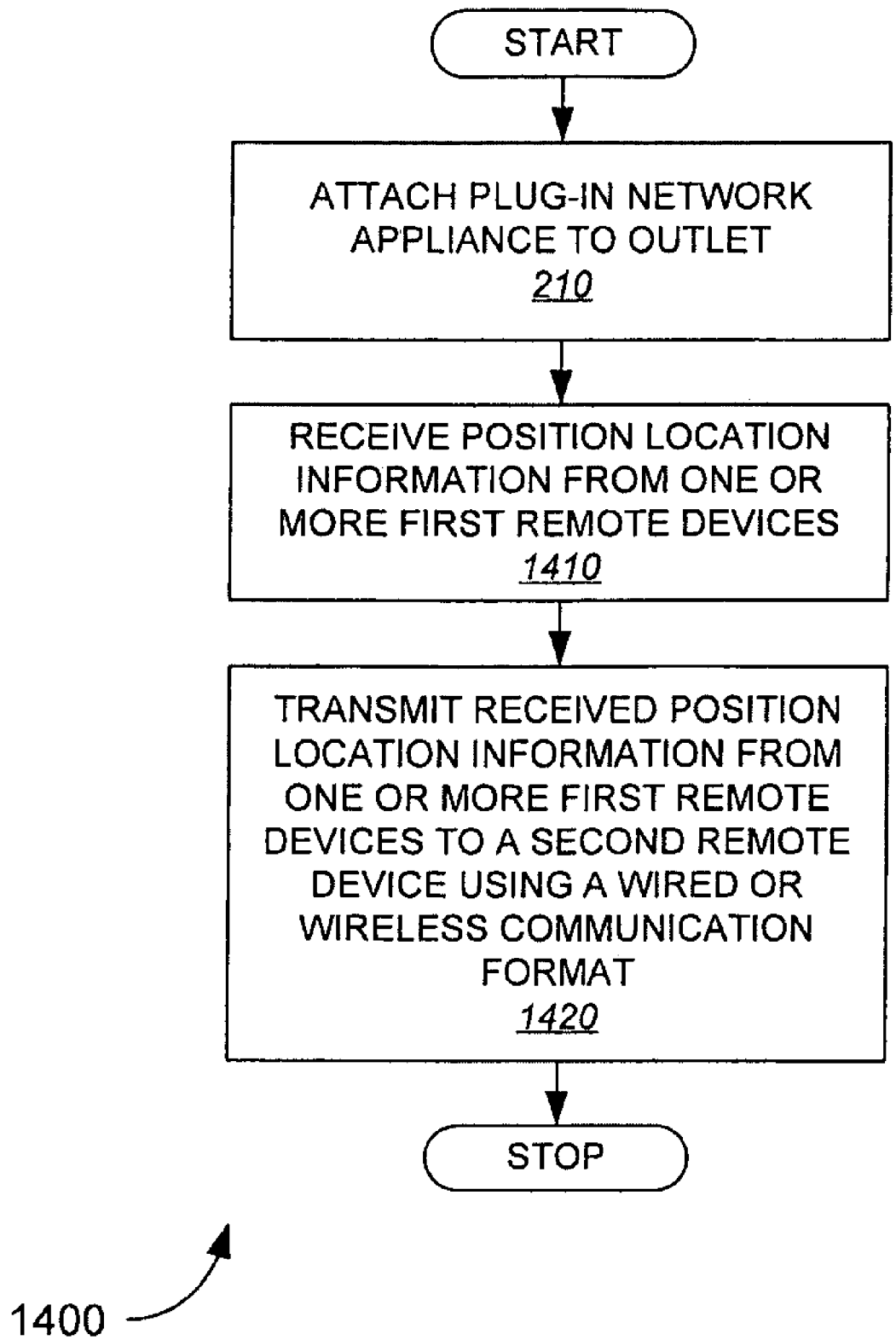
FIG. 14 depicts an example embodiment of a method for bridging position location information in a plug-in network appliance.

FIG. 14 depicts an example embodiment of a method 1400 for bridging position location information in a plug-in network appliance. Again, at 210, attach a plug-in network appliance to an outlet. At 1410, receive position location information from one or more first remote devices. As described above, these first remote devices may include any device from which position location information may be received. At 1420, transmit received position location information from one or more first remote devices to a second remote device (such as those described above with respect to FIGS. 12-13) using a wired or wireless communication format, and a respective wired or wireless connection.

Figure 15:
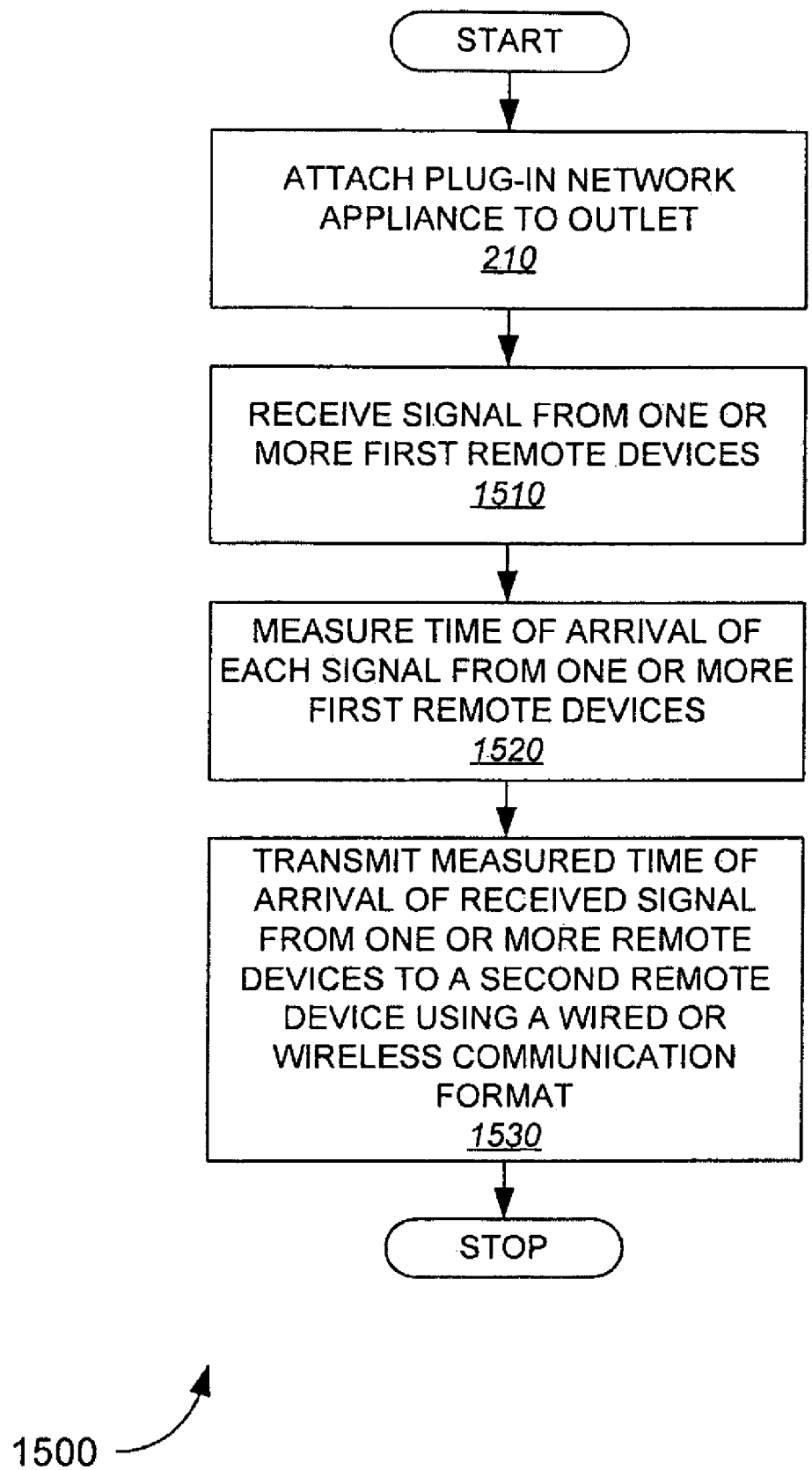
FIG. 15 depicts an example embodiment of method for measuring and transmitting signal time arrival in a plug-in network appliance.

FIG. 15 depicts an example embodiment of a method 1500 for measuring and transmitting signal time arrival in a plug-in network appliance. Again, at 210, attach the plug-in network appliance to an outlet. At 1510, receive a signal from one or more first remote devices. At 1520, measure the time of arrival from each signal received from the one or more first remote devices. The time of arrival data may be stored in a memory. At 1530, transmit the measured time of arrival of a received signal from one or more remote devices to a second remote device (for example, a position location engine, or any other remote device) using a wired or wireless communication format and respective connection.

Additional variations may be deployed, which will be apparent to those of skill in the art in the light of the teaching herein. For example, multiple antennas may be deployed, each directional, and affixed at differing angles from one another. The network appliance may measure the received signal strength or time of arrival at the various antennas, determine the antenna at which the signal was received, and thus determine the angle from which the signal arrived. When the signal is detected at more than one antenna, one or more measured parameters, such as RSSI at one or more antennas, may be used to weight the various antenna angles and determine an estimate of the angle in response. Alternately, a programmable direction antenna may sweep angles over a desired range (a programmable azimuth may also be deployed to assist in third dimension position location), and the angle selected with desired signal reception may be selected. This angle information (in any of these embodiments) may be stored in memory and/or transmitted to a remote device. In yet another embodiment, two or more antennas are used, and the difference in arrival time or phase difference between the antennas is used to determine the angle of attack.

In various embodiments, a communicating device may comprise an identifier (ID) of some kind. This identifier may be received and stored and/or transmitted to a remote device. A remote device may associate an ID for a non-moving device, such as a network monitor, with a fixed location. An ID for a mobile device may be used to identify the object for which position location information is processed (i.e., to determine a location). An ID for either a fixed or mobile device may be used to facilitate data transmission to the associated device for network bridging functions. In one example, an ID may be an IP address, or another ID associated therewith. An ID may be transmitted along with any of the signals described herein. A receiving device may retrieve that ID and transmit it to a remote device, along with any data, measurements, etc., that correspond to that device.

A network appliance may also perform various processing on received and/or measured data prior to forwarding on a network bridge or transmitting to a remote station (i.e., to a position location engine, whether or not through one or more intermediate devices or network interfaces/connections). For example, a statistical analysis may be performed. A combination of old data and new data may be accomplished using an averaging technique, Bayesian Filtering, Kalman Filtering, Hidden Markov Modeling, or other statistical methods known in the art.

Bayesian Filters consist of a number of nodes, or states, with links between each node based on the probability that one state will lead to another, based on the values of past states. In a positioning system, a Bayesian Filter computes the probability that a mobile device is at one or more locations based on the inputs received from the mobile device. From this information the final location of the mobile device may be calculated.

Measuring a quantity often results in a value and an error. Measuring a quantity that does not change may produce several values, each with a different error. Kalman filtering is a method to combine several measurements based on their value and error. Kalman filtering performs a weighted average of the measurements. The weight assigned to each measurement is inversely proportional to its error—a value with a high amount of error will be weighted less than a value with a low amount of error. In positioning systems, this method is used to determine a location from the combination of multiple location calculations, each location calculation having a corresponding amount of error and the resulting error is smaller than the first measurement's error.

The Hidden Markov Model is a finite set of states, each of which is associated with a (generally multidimensional) probability distribution. Transitions among the states are governed by a set of probabilities called transition probabilities. In a particular state, an outcome or observation can be generated, according to the associated probability distribution. It is only the outcome, not the state, that is visible to an external observer and therefore states are "hidden" to the outside. In positioning systems, this method is used to determine a location (a state) from the information received from the mobile devices and calibration points. Various other types of analyses will be apparent to those of skill in the art in light of the teaching herein.

Figure 16:
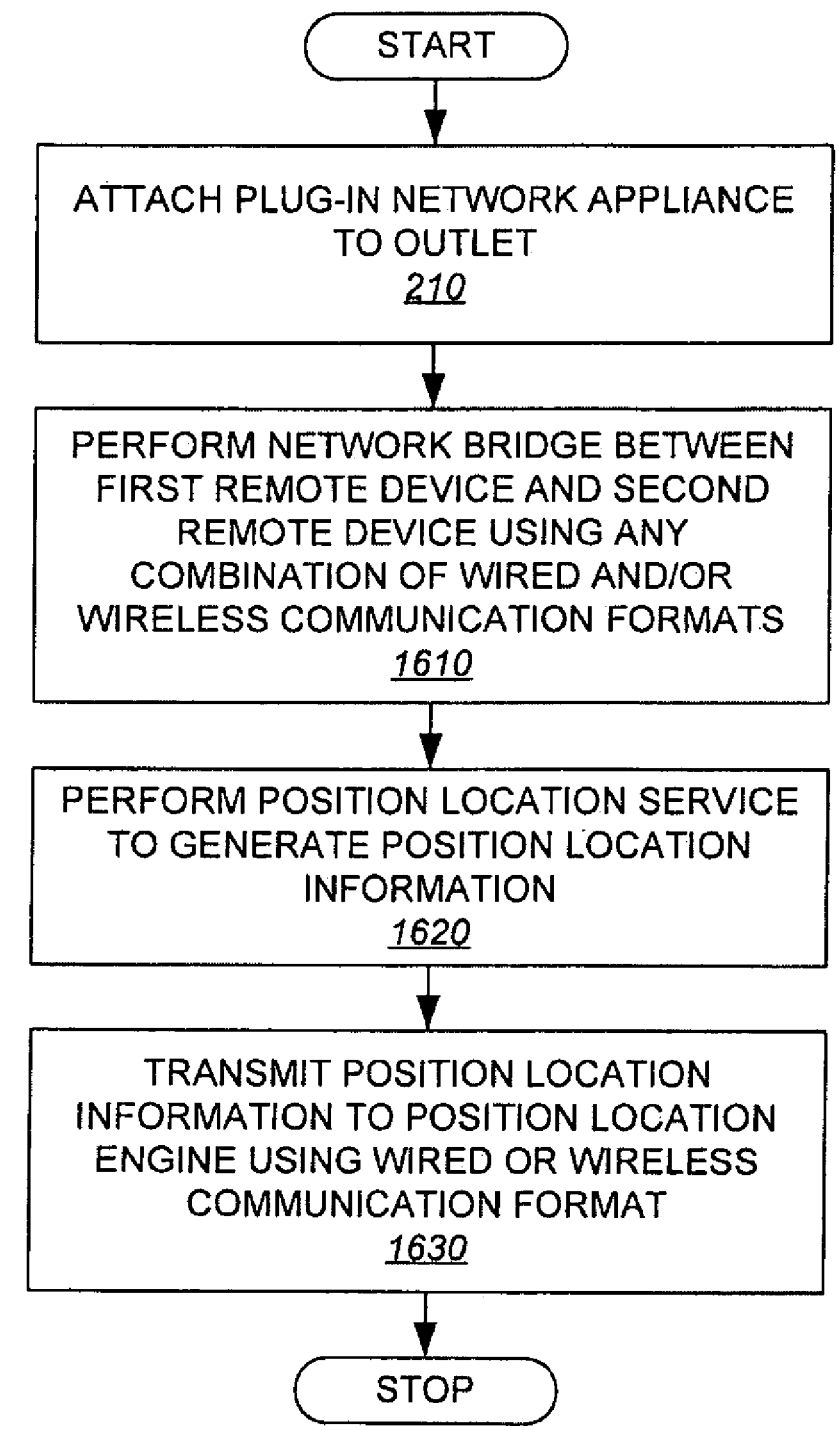
FIG. 16 depicts an example embodiment of a method for a combination network bridge and position location service in a plug-in network appliance.

FIG. 16 depicts an example embodiment of a method 1600 for a combination network bridge and position location service in a plug-in network appliance. As before, at 210 attach a plug-in network appliance to an outlet from which to provide power to various components of the network appliance, as detailed above. At 1610, perform a network bridge between a first remote device and a second remote device using any combination of wired and/or wireless communication formats. Various examples of wired and wireless communication formats are detailed herein. The wired communication format may be transmitted on a data network riding on the network connected to the outlet, if one is available, or may use an optional alternate wired connection. The network appliance may also use any wireless format, and may support more than one wireless format as well. In one embodiment, a network appliance may perform a wireless-only bridge, using two or more wireless communication formats. In an alternate embodiment a network appliance may bridge a single wireless communication format with an attached wired network. At 1620, perform a position location service to generate position location information. This may include network monitor functions such as those detailed above. For example, position location information may be generated by measuring signal attributes, such as received signal strength, or time of arrival for various signals within the system (i.e. beacons or signals from remote devices such as tags). Alternately, position location information may be generated by receiving such information from one or more remote devices, as described above. Any position location information generating function may be deployed. At 1630, transmit position location information to a position location engine (or another network device or devices connecting the position location engine to the network appliance) using any combination of wired or wireless communication formats and/or networks.

Figure 17:
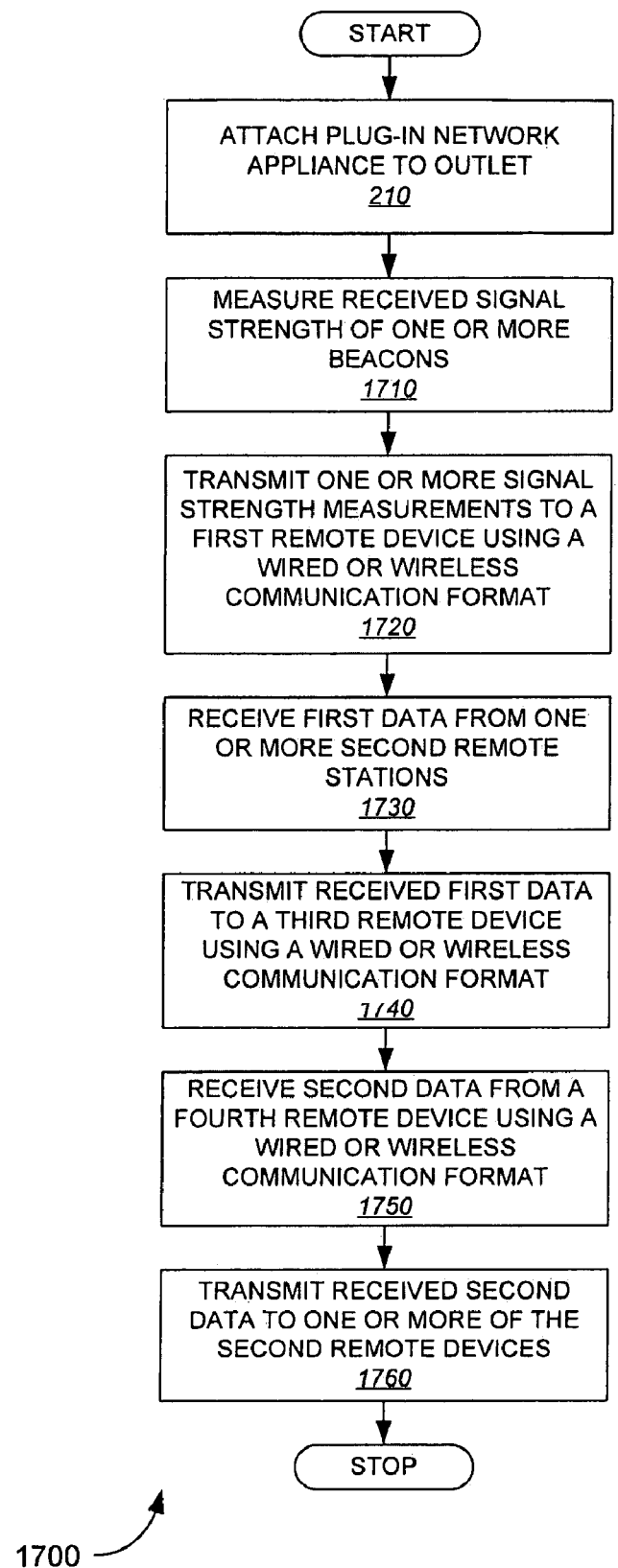
FIG. 17 depicts an example embodiment of a method for bridging data and measuring beacons in a plug-in network appliance.

FIG. 17 depicts an example embodiment of a method 1700 for bridging data and measuring beacons in a plug-in network appliance. Again, at 210, attach a plug-in network appliance to an outlet. At 1710, measure received signal strength of one or more beacons (where beacons may include any signal, noise, or other source within a system). At 1720, transmit one or more signal strength measurements to a first remote device using a wired or wireless communication format. In an example embodiment, the remote device may be a position location engine, or another network device configured to receive, process and/or forward such measurements. At 1730, receive first data from one or more second remote stations. The first data may comprise position location information or may be any other type of data for use in any type of data service (including voice, video, or any other data). At 1740, transmit the received first data to a third remote device using a wired or wireless communication format. The third remote device may be any device on the respective wired or wireless network, and the data may be processed through one or more intermediate devices along the network connection. At 1750, receive second data from a fourth remote device using a wired or wireless communication format. The fourth remote device, again, may be any device connected on the respective wired or wireless network. In this example, the received second data is directed to one of the one or more second remote devices, described above. At 1760, transmit the received second data to one or more of the second remote devices to which the data is directed. Again, any type of data may be transmitted. Thus, in this example, a plug-in network appliance may perform network monitoring functions, (measuring received signal strength in this particular example), as well as performing network bridge services to connect any two devices via the available networks, as described.

Figure 18:
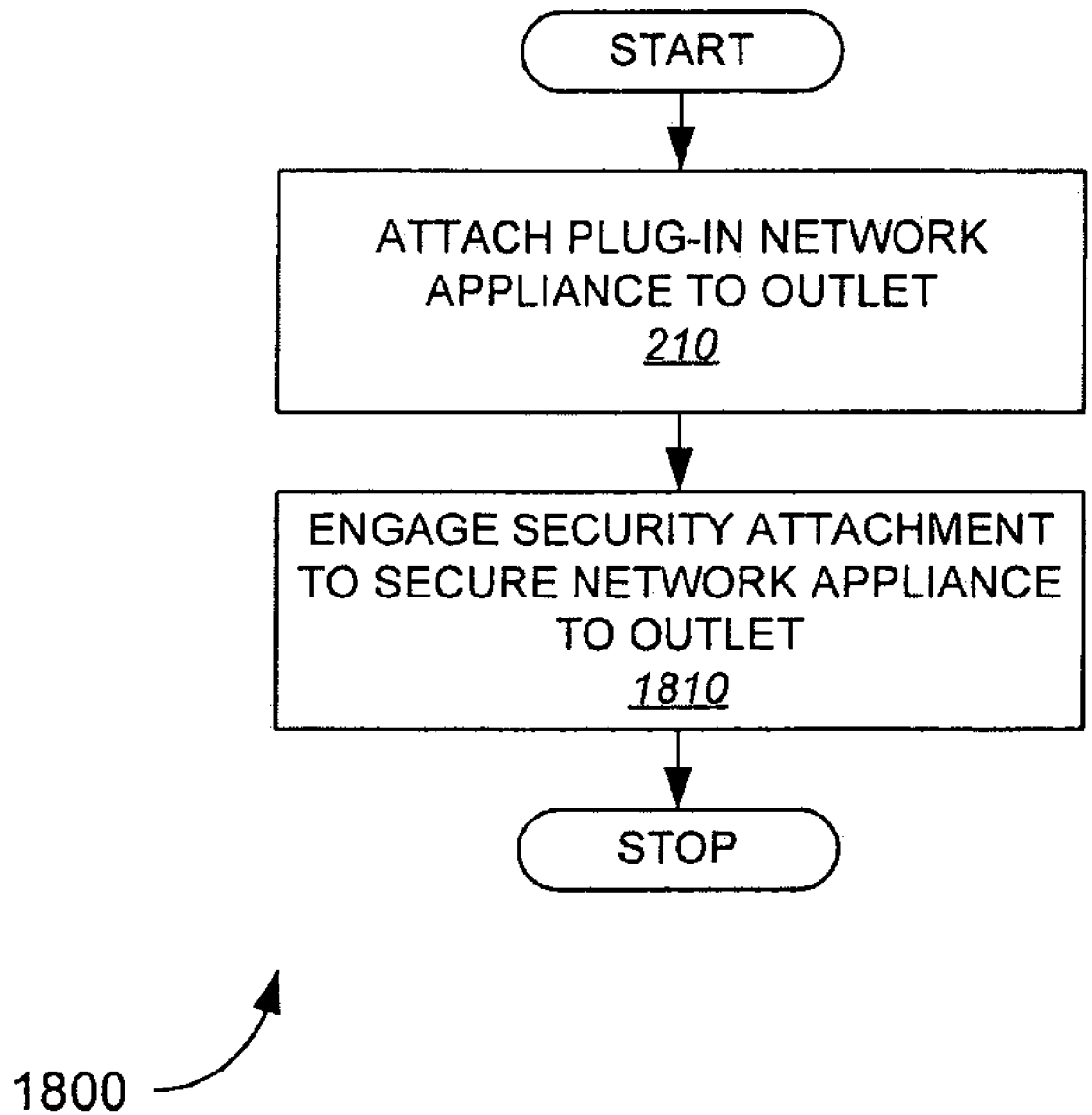
FIG. 18 depicts an example embodiment of a method for securely attaching a plug-in network appliance to an outlet.

FIG. 18 depicts an example embodiment of method 1800 for securely attaching a plug-in network appliance to an outlet. As before, at 210, attach a plug-in network appliance to an outlet. At 1810, engage a security attachment to secure the network appliance to the network. The security attachment may be any type of attachment to prevent accidental dislodging of the plug-in network appliance, such as a screw, or may provide additional security such as a locking apparatus, techniques for which are known in the art. Example security attachments 136 are detailed above.

Figure 19:
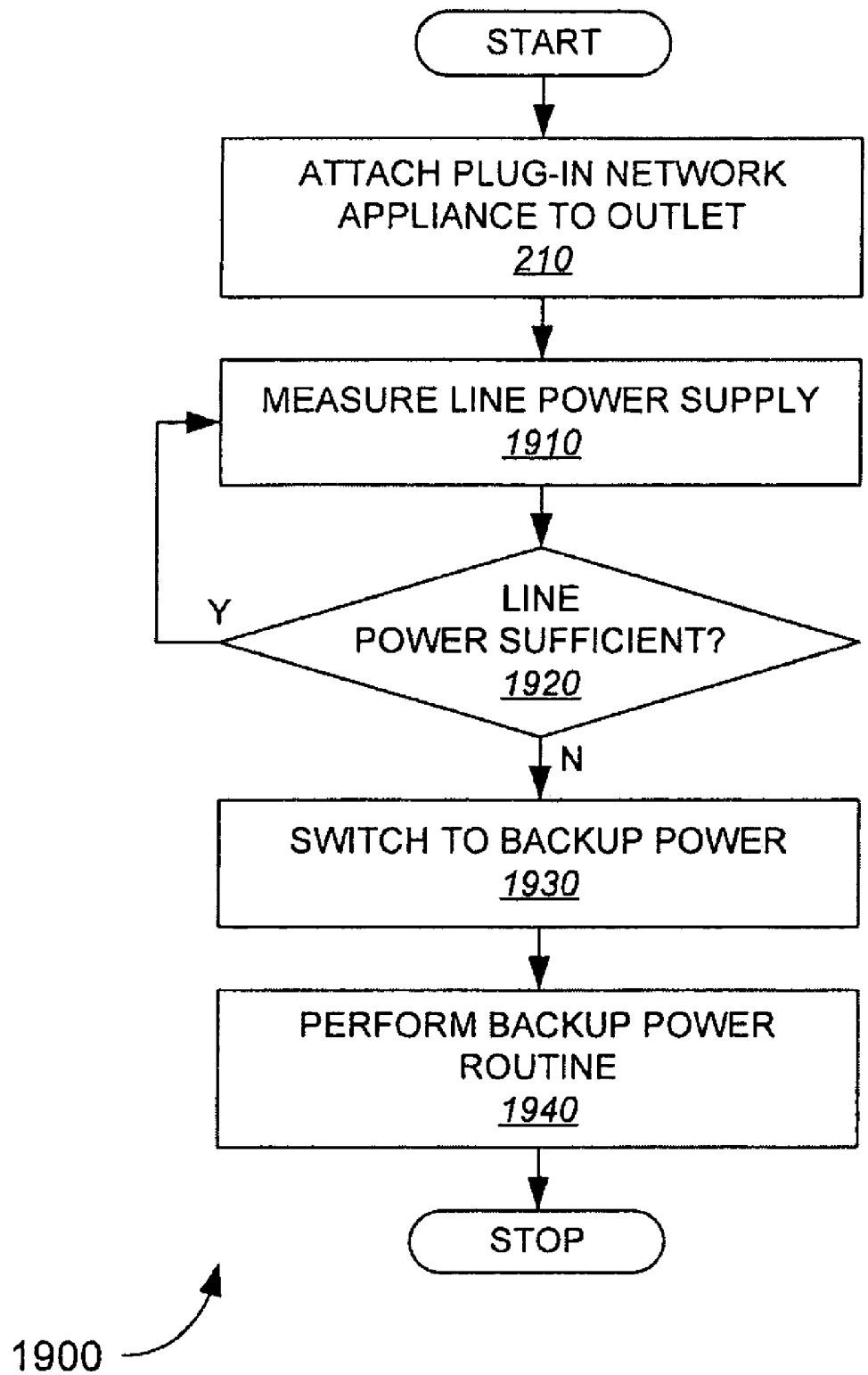
FIG. 19 depicts an example embodiment of a method for monitoring supplied line power to a plug-in network appliance.

FIG. 19 depicts an example embodiment of a method 1900 for monitoring supplied line power to a plug-in network appliance. This method may be deployed in conjunction with an embodiment, such as that described above with respect to FIG. 3, as well as myriad other variations. Again, at 210, attach a plug-in network appliance to an outlet. At 1910, measure the line power supply. In one embodiment, a line sensor 316, detailed above, may be deployed to measure various characteristics of the line power received through a plug 132 or 134 via an outlet 150 or 160, respectively, to measure the supplied voltage or other characteristic of network 110 or 120. At decision block 1920, if the line power is deemed sufficient, the process loops back to 1910 to continue monitoring the line power.

Any criteria may be deployed to determine sufficiency of the line power. For example, a minimum voltage may be determined. Other characteristics such as frequency, noise, or any other characteristic may be measured alternately, or in combination with other characteristics. If the line power is deemed insufficient, proceed to 1930. At 1930, switch to backup power (switching to backup power serves to illustrate one example technique for responding to a change in line power). Backup power may include a battery such as battery 330 (including capacitors and other temporary power supplies). A power select circuit such as power select 335 may be used to select between back up power and line power, for example that supplied through power supply 320, detailed above. Various other techniques are known in the art and modifications will be readily apparent to one of ordinary skill in the art in light of the teaching herein.

At 1940, perform a backup power routine (optional). Various backup power routines may be deployed in accordance with the desired performance of the network appliance. For example, if very limited power is available for backup, a message may be transmitted through a remote device indicating that the power supply conditions have changed. Other messages may also be transmitted. In an alternate embodiment, the plug-in network appliance may enter a low power mode until line power has been restored. Various other components may be activated as well such as visual indicators 360 or audible indicators 365, detailed above. For example, a disturbance in line power may be used to detect when a network appliance is unplugged from an outlet. A message may be sent to a remote device, or an audible indicator such as a speaker may be activated.

Figure 20:
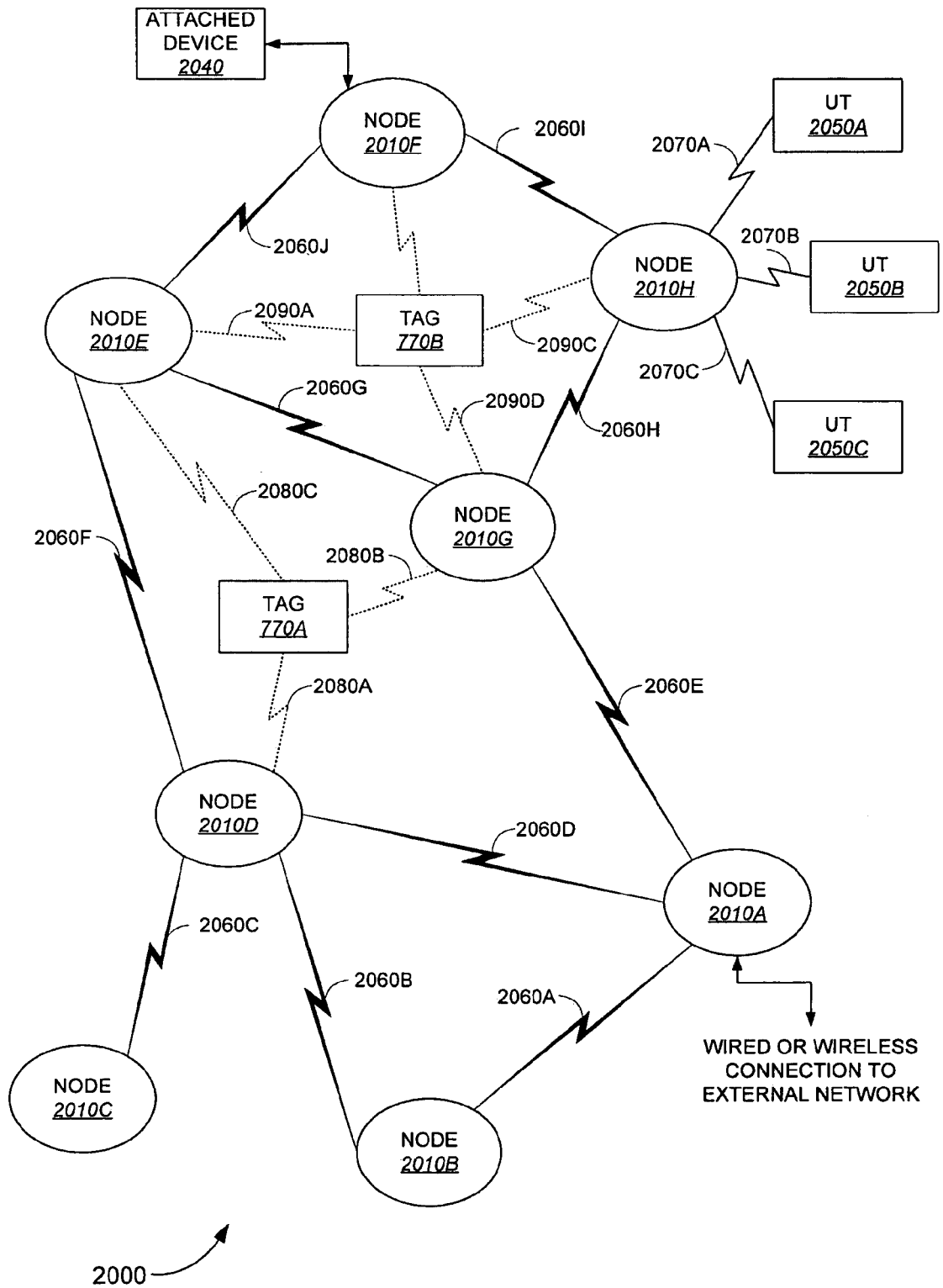
FIG. 20 depicts an example embodiment of a system illustrating several mesh network aspects.

FIG. 20 depicts an example embodiment of a system 2000 illustrating several mesh network aspects. An illustrative mesh network 2000, as shown, includes various mesh nodes 2010. A mesh node 2010 forms a portion of a mesh network by connecting via one or more wireless links 2060. Mesh nodes may be able to communicate to one or more neighbor nodes 2010 via one or more links 2060. When a node has more than one neighbor, the node may be used for routing messages through the mesh. For example, a message may be received from a first neighbor node on a first wireless link 2060 and forwarded to a second neighbor node on a second wireless link. Note that various communication formats may be deployed to perform mesh networks, including the wireless data formats detailed above. In general, a mesh network may utilize a single communication format (perhaps utilizing one or more frequencies) and differing mesh networks may be connected via one or more bridge devices, such as those detailed above (details not shown). For example, node 2010B has neighbors 2010A and 2010D, joined by links 2060A and 2060B, respectively. In some cases, a node may have more than two neighbors. In such cases, there may be multiple paths on which to forward received packets. Various algorithms may be deployed to determine routing, examples of which are detailed below.

A mesh node may connect to one or more other devices to form communication channels. For example, attached device 2040 is shown wired to node 2010F. Attached 2040 may be any type of device such as a workstation, server, printer, user terminal (in general), or any other device. Node 2010A is shown connected to an external network via a wired or wireless connection using any of the techniques such as those described above. Node 2010H is an example of a mesh node operable to perform access point functions as well. In this case, node 2010H serves as a mesh node for receiving or transmitting packets from nodes 2010F or 2010G as well as performing communication on WLAN 2070 (illustrated as 2070A-C) with user terminals 2050A-C, respectively. The communication format of WLAN 2070 may be any type of communication format, such as those listed above and may be the same, similar to, or different than the wireless communication format used for mesh network 2060.

Nodes 2010 serve as examples of a plug-in network appliance 130, detailed above. In this example one or more nodes 2010 may be deployed as plug in network appliances to perform the function of a mesh node, a network monitor, a network bridge, an access point, or any of the various network services described herein (or any combination of the above). The plug-in form factor allows for convenient deployment of mesh nodes throughout an environment.

In one embodiment, a mesh network may also be used for position location services, as described above. In this example, one or more nodes 2010 serve as network monitors, which perform network monitor functions, such as those detailed above, along with serving as mesh nodes for transmitting data in general, including position location information of any type, through the mesh network 2060. For example, a position location engine such as positioning engine 710 may be connected to a node, such as node 2010A, as shown in FIG. 20. Tags 770A-B are shown transmitting signals 2080 and 2090, respectively. A tag 770 may perform any tag functions, examples of which are detailed above.

In this example, a tag 770 may periodically emit a signal, which may be received at neighboring nodes. In this example, tag 770A emits signal 2080, which is received at nodes 2010D, G, and E, via links 2080A-C, respectively. Similarly, tag 770B emits signal 2090, which is received at nodes 2010E-H, on links 2090A-D, respectively. The received signals are measured at their respective nodes, and the signal measurements, or computations based on signal measurements, of various types, may form position location information for transmission to a positioning engine or other remote device via mesh network 2060. In one embodiment, triangulation may be used by adjacent nodes to locate a tag 770. In various other examples, any of the other techniques, detailed above, may be deployed.

In this example, access points and/or beacons need not be deployed. In one embodiment, a mesh network formed by plug-in network appliances configured as network monitors and mesh nodes may be deployed throughout a facility. One or more mesh nodes, such as node 2010A, may connect via a wired or wireless connection to an external network to communicate with a position engine, or a positioning engine may be attached directly to any node (either wired or wirelessly). While a beacon of any type may be deployed for measurement by nodes 2010, to measure variations in the environment, a tag 770, emitting a signal 2080 or 2090 may also be used. For example, one or more tags may be distributed throughout the environment for the purpose of providing beacon signals. The tags may emit a signal periodically, when movement is detected, upon receiving a directive from a remote device, or any of the other techniques described above. In another alternative, nodes 2010 may measure the signal strength of neighbor nodes and use these measurements for updating the environment, as described above. Myriad other combinations of plug-in network appliances, and other devices, may be deployed to provide position location services in a mesh network, as will be clear to one of skill in the art in light of the teaching herein.

In a general mesh network, a node is used for routing messages if it has more than one neighbor. A node receives a message from a neighbor node on the wireless interface (on a first link) and, based on that message, transmits it to another neighbor node using the same wireless interface (on a second link). The information in a message may be used as a basis for routing. Examples include (a) the source of the message, (b) from which neighbor the node received the message, (c) the link quality or signal strength of the received message, (d) through which other Nodes in the network the message has passed, (e) the destination of the message, (f) message routing information in the message (e.g. a sequence of nodes for the message to traverse to its destination), (g) routing information received from other nodes (e.g. route announcements from other nodes), (h) any other information in the message or observed in other data traffic, or (i) various others.

Techniques for forming mesh networks are known in the art. Mesh networks typically allow for nodes to be added and deleted and thus allow for mobile devices and links there between to be created and torn down. Thus, mesh networks adapt, adding and subtracting nodes and respective links, as necessary. Various techniques for determining the connections between nodes are known. For example, the Ad-hoc On-demand Distance Vector (AODV) routing algorithm may be deployed. Mesh routing algorithms, which may be used to determine various nodes available, and connections between them, may be used to set up the mesh network, either proactively or reactively. A proactive routing mesh algorithm allows the network to set up routes in advance, whether or not those routes are needed. Thus, routes tend to be always available to route traffic, such as packet data, between various nodes. One drawback to these techniques is that an increased amount of traffic may be required to set up the routes in advance, and some of those routes may not be used.

An example of a proactive mesh routing algorithm is a flooding algorithm. A source node broadcasts a request message to its neighbors. When a node receives this request for the first time, it rebroadcasts it to the node's neighbors (duplicates of the same request are ignored). Each node records which of its neighbors it received the route from so that the node knows how to route messages back to the source. After the request message has been received by all nodes, all nodes know how to route messages to the source.

A reactive mesh routing algorithm allows for the mesh network to set up routes on demand. One advantage is that routes are not wasted. One disadvantage is there may be delay in getting packets delivered while a route is set up. Examples, known in the art include the Dynamic Source Routing (DSR) protocol, AODV (which is used in Zigbee) and Topology Based on Reverse Path Forwarding (TBRPF), such as the HotPoint devices available from Firetide Systems, Inc. of Los Gatos, Calif. Note that AODV is based on a combination of DSR and flooding.

To send a message from one node to another, a route is formed between the two. For example, in AODV, to determine a route from one device (source) to another (destination) the following may occur: (1) A source broadcasts a Route Request (RREQ) to nearby devices. (2) A device that receives the RREQ keeps track of who is sending it messages in a routing table. If the device hasn't received that route request yet, then it broadcasts the RREQ to its neighbors. (3) When the destination finally receives the RREQ, it transmits back a Route Reply (RREP) to the source along the established route. A route may be permanent, or it may be periodically refreshed (e.g. once per pre-defined time period).

Protocols may be source-routed or destination-routed. In a source-routed algorithm (e.g. DSR), the sender attaches the route to the message, specifying each hop to use, prior to sending. When a node receives the message, the node forwards the message as specified in the routing information in the message. This may require that each source have knowledge of each possible destination. In destination-routed algorithms (e.g. Flooding, AOV, TBRPF), each node maintains a routing table of possible destinations, and which of the neighboring nodes to use for each destination.

A description of an example routing of the AODV algorithm may be found at URL http://moment.cs.ucsb.edu/AODV/aodv.html, expressly incorporated by reference herein, an excerpt of which is adapted as follows: The Ad-hoc On-demand Distance Vector (AODV) routing algorithm is a routing protocol designed for ad hoc mobile networks. AODV is capable of both unicast and multicast routing. It is an on-demand algorithm, meaning that it builds routes between nodes only as desired by source nodes. It maintains these routes as long as they are needed by the sources. Additionally, AODV forms trees, which connect multicast group members. The trees are composed of the group members and the nodes needed to connect the members. AODV uses sequence numbers to ensure the freshness of routes. It is loop-free, self-starting, and scales to large numbers of mobile nodes.

AODV builds routes using a route-request/route-reply query cycle. When a source node desires a route to a destination for which it does not already have a route, it broadcasts a route request (RREQ) packet across the network. Nodes receiving this packet update their information for the source node and set up backwards pointers to the source node in the route tables. In addition to the source node's ID (for example, an IP address, a MAC address, a Zigbee short address, or any other identifier), current sequence number, and broadcast ID, the RREQ also contains the most recent sequence number for the destination of which the source node is aware. A node receiving the RREQ may send a route reply (RREP) if it is either the destination or if it has a route to the destination with corresponding sequence number greater than or equal to that contained in the RREQ. If this is the case, it unicasts a RREP back to the source. Otherwise, it rebroadcasts the RREQ. Nodes keep track of the RREQ's source ID and broadcast ID. If they receive a RREQ, which they have already processed, they discard the RREQ and do not forward it.

As the RREP propagates back to the source, nodes set up forward pointers to the destination. Once the source node receives the RREP, it may begin to forward data packets to the destination. If the source later receives a RREP containing a greater sequence number, or contains the same sequence number with a smaller hop count, it may update its routing information for that destination and begin using the better route.

As long as the route remains active, it will continue to be maintained. A route is considered active as long as there are data packets periodically traveling from the source to the destination along that path. Once the source stops sending data packets, the links will time out and eventually be deleted from the intermediate node routing tables. If a link break occurs while the route is active, the node upstream of the break propagates a route error (RERR) message to the source node to inform it of the now unreachable destination(s). After receiving the RERR, if the source node still desires the route, it can reinitiate route discovery.

Multicast routes are set up in a similar manner. A node wishing to join a multicast group broadcasts a RREQ with the destination ID set to that of the multicast group and with the 'J' (Join) flag set to indicate that it would like to join the group. Any node receiving this RREQ that is a member of the multicast tree that has a fresh enough sequence number for the multicast group may send a RREP. As the RREPs propagate back to the source, the nodes forwarding the message set up pointers in their multicast route tables. As the source node receives the RREPs, it keeps track of the route with the freshest sequence number, and, beyond that, the smallest hop count to the next multicast group member. After the specified discovery period, the source node will unicast a Multicast Activation (MACT) message to its selected next hop. This message serves the purpose of activating the route. A node that does not receive this message that had set up a multicast route pointer will timeout and delete the pointer. If the node receiving the MACT was not already a part of the multicast tree, it will also have been keeping track of the best route from the RREPs it received. Hence, it must also unicast a MACT to its next hop, and so on, until a node that was previously a member of the multicast tree is reached.

AODV maintains routes for as long as the route is active. This includes maintaining a multicast tree for the life of the multicast group. Because the network nodes may be mobile, it is likely that many link breakages along a route will occur during the lifetime of that route. Various techniques for handling link breakages are known.

Those skilled in the art will readily adapt the example embodiment of plug-in network appliance 130, depicted in FIG. 3, for deployment as a mesh network node, as well as a combination of various other embodiments detailed herein. Processor 340 may be used to perform any of the mesh network functions described herein, including routing of mesh traffic, position location functions, network bridging, etc. Processor 340 may process received messages, format messages for transmission, evaluate packets (including headers and fields therein), selecting nodes, mapping identifiers or addresses, performing measurements, and the like. One or more WLAN interfaces 380 may be used for transmission and reception on the mesh network. Routing tables may be stored in memory, such as RAM 350 or non-volatile memory 355. Processor 340 may be used in forming routing tables, retrieving routing information from routing tables, making routing decisions, etc. Messages may be included in data packets, which may comprise headers comprising various fields (example fields include source, destination, transmitting node, next target node, length fields, and others).

Figure 21:
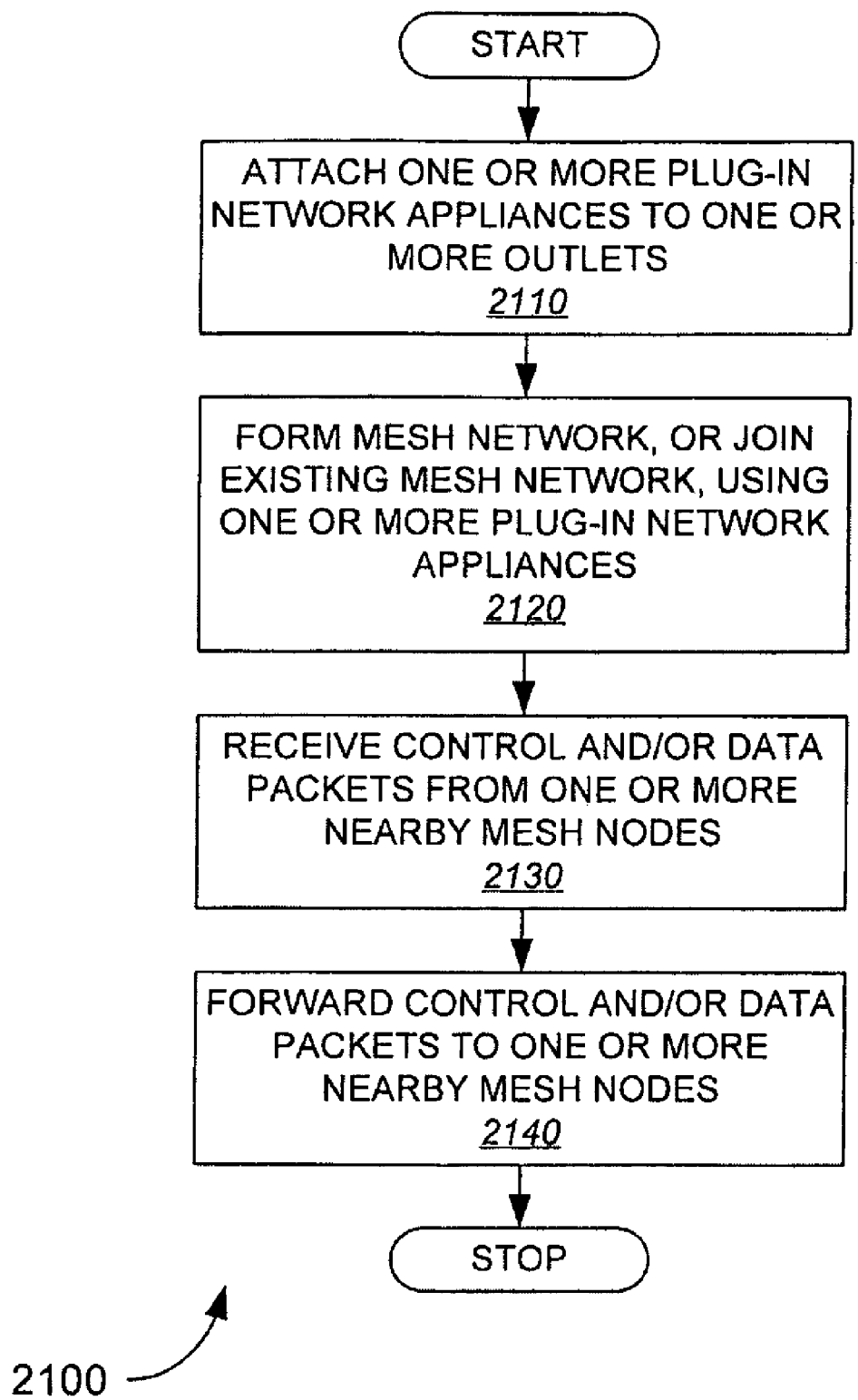
FIG. 21 depicts an example embodiment of a method for forming a mesh network with one or more network appliances.

FIG. 21 depicts an example embodiment of a method 2100 for forming a mesh network with one or more network appliances. At 2110, attach one or more plug-in network appliances to one or more outlets, as detailed above. At 2120, form a mesh network, or alternately, join an existing mesh network, using one or more plug-in network appliances. Note that, in various embodiments, a mesh network may comprise a combination of mesh nodes in a plug-in form factor, as detailed herein, as well as mesh nodes using other form factors. At 2130, receive control and/or data packets from one or more mesh nodes. Note that data transmitted through a mesh network is typically packet data, and generally includes a header portion, including one or more fields used in routing and/or control of the packet, as well as a data payload. In addition, a packet may incorporate control information in a data payload as well, for use in various network service functions. Control information may include routing information for use in an established mesh network, or may include control information for establishing the mesh network, examples of which are described above. At 2140, the mesh node, having received the control and/or data packets from one or more nearby mesh nodes, forwards those packets to one or more other nearby mesh nodes. Any of the techniques for determining the next node in the mesh to which a transfer should be made may be deployed (i.e. using a routing table, information from a header in the packet, or using a default path). Note that packets may be unicast (transmitted from one source to a single destination) or may be multicast (transmitted from a source to multiple destinations). Multicast transmission may be used to broadcast control and/or data to one or more nodes throughout a mesh network, as well as to devices attached thereto.

Figure 22:
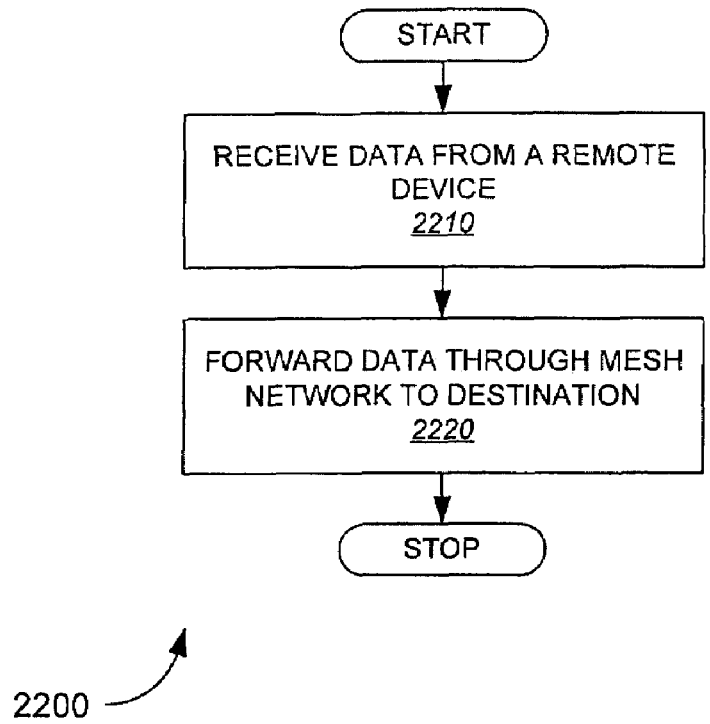
FIG. 22 depicts an example embodiment of a method for receiving data from a device at the edge of a mesh network.

FIG. 22 depicts an example embodiment of a method 2200 for receiving data from a device at the edge of a mesh network. Method 2200 may be an extension of method 2100 described above. At 2210, data is received from a remote device attached to a mesh node. For example, devices 2040 or 2050 are attached to nodes 2010F or 2010H, respectively, as illustrated above with respect to FIG. 20. At 2220, forward data through the mesh network to the destination. As before, data may be forwarded using any of the routing techniques described above. Furthermore, the ultimate destination may be a node within the mesh network, a device attached to a mesh network mode, or any other device, communicatively connected to the mesh network.

Figure 23:
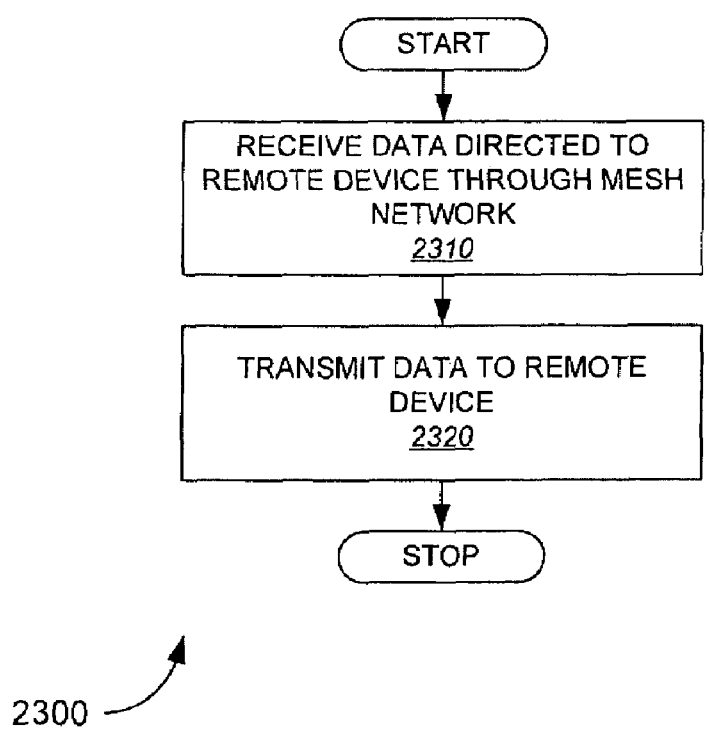
FIG. 23 depicts an example embodiment of a method for transmitting data to a remote device connected at the edge of a mesh network.

FIG. 23 depicts an example embodiment of a method 2300 for transmitting data to a remote device connected at the edge of a mesh network. Again, method 2300 may be an extension of method 2100, as well as method 2200, illustrated above. At 2310, receive data directed to a remote device through the mesh network. Any node within the mesh may receive such data and forward this data to another mesh node in the network, until the edge of the mesh is reached. At 2320, a mesh node transmits the data to a remote device connected thereto either directly or indirectly via a network connection. Note that the remote device may be connected to the transmitting mesh node via a wireless or wired connection, which may be the same format or a different format as the communication format used in the mesh network.

Figure 24:
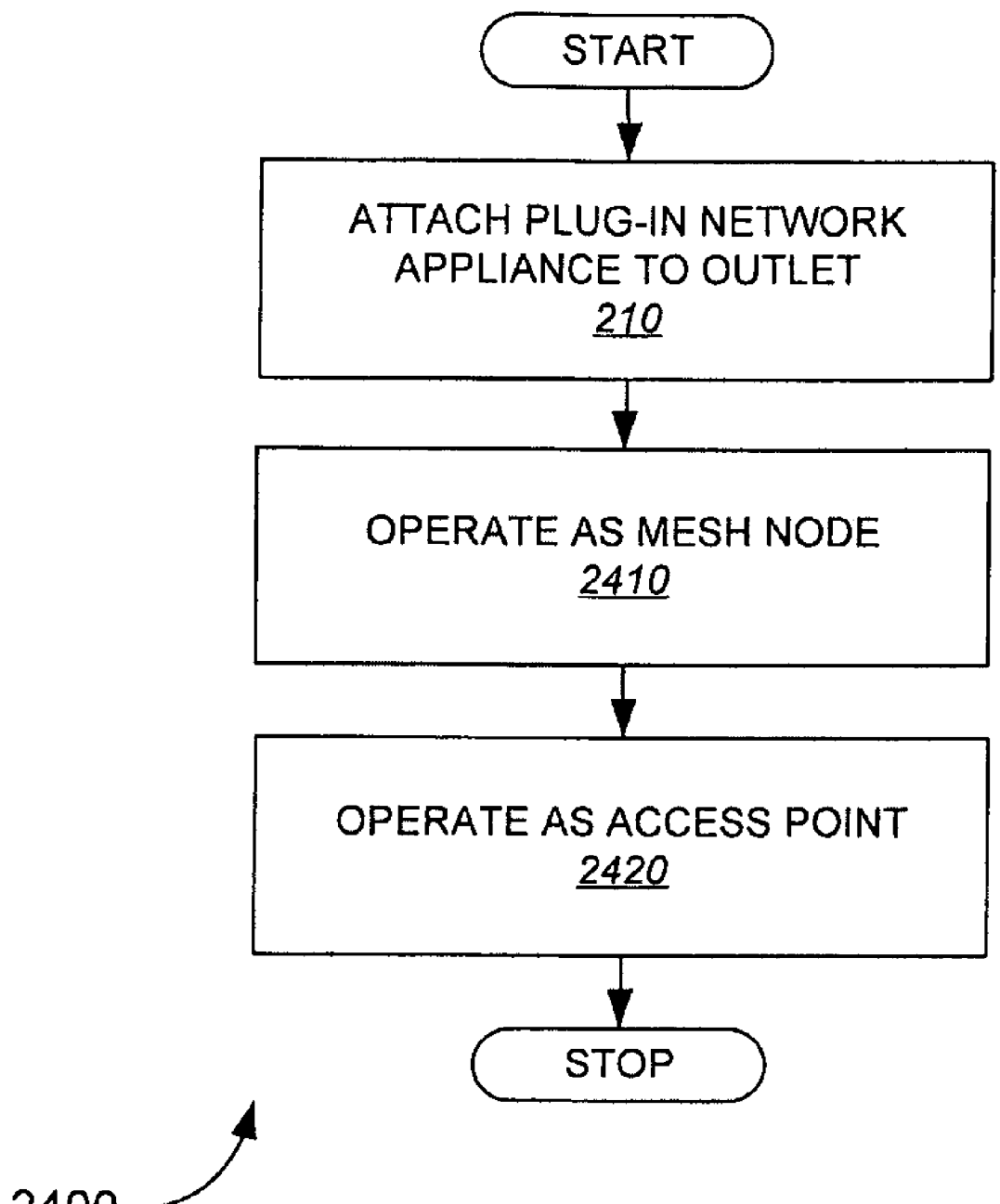
FIG. 24 illustrates an example embodiment of a method for operating a plug-in network appliance node as a combination mesh node and access point.

FIG. 24 illustrates an example embodiment of a method 2400 for operating a plug-in network appliance as a combination mesh node and access point. At 210, as described above, attach the plug-in network appliance to an outlet. At 2410, operate the plug-in network appliance as a mesh node, using one or more techniques, well known in the art, examples of which are detailed above. At 2420, operate the plug-in network appliance as an access point. For example, see node 2010H, illustrated above with respect to FIG. 20. Node 2010H communicates with user terminals 2050 via wireless network 2070, as described. Wireless network 2070 may be the same or different format as wireless communication format 2060 (the mesh network). Data may be delivered to any node on the mesh network from a user terminal 2050 through node 2010. Or, a connection to an external network, such as the Internet, may be made through the mesh network using a mesh node bridging to the external network, such as node 2010A. A plug-in network appliance may combine any of the functions detailed herein, and the method 2400 illustrated in FIG. 24 serves to illustrate one of these examples.

Figure 25:
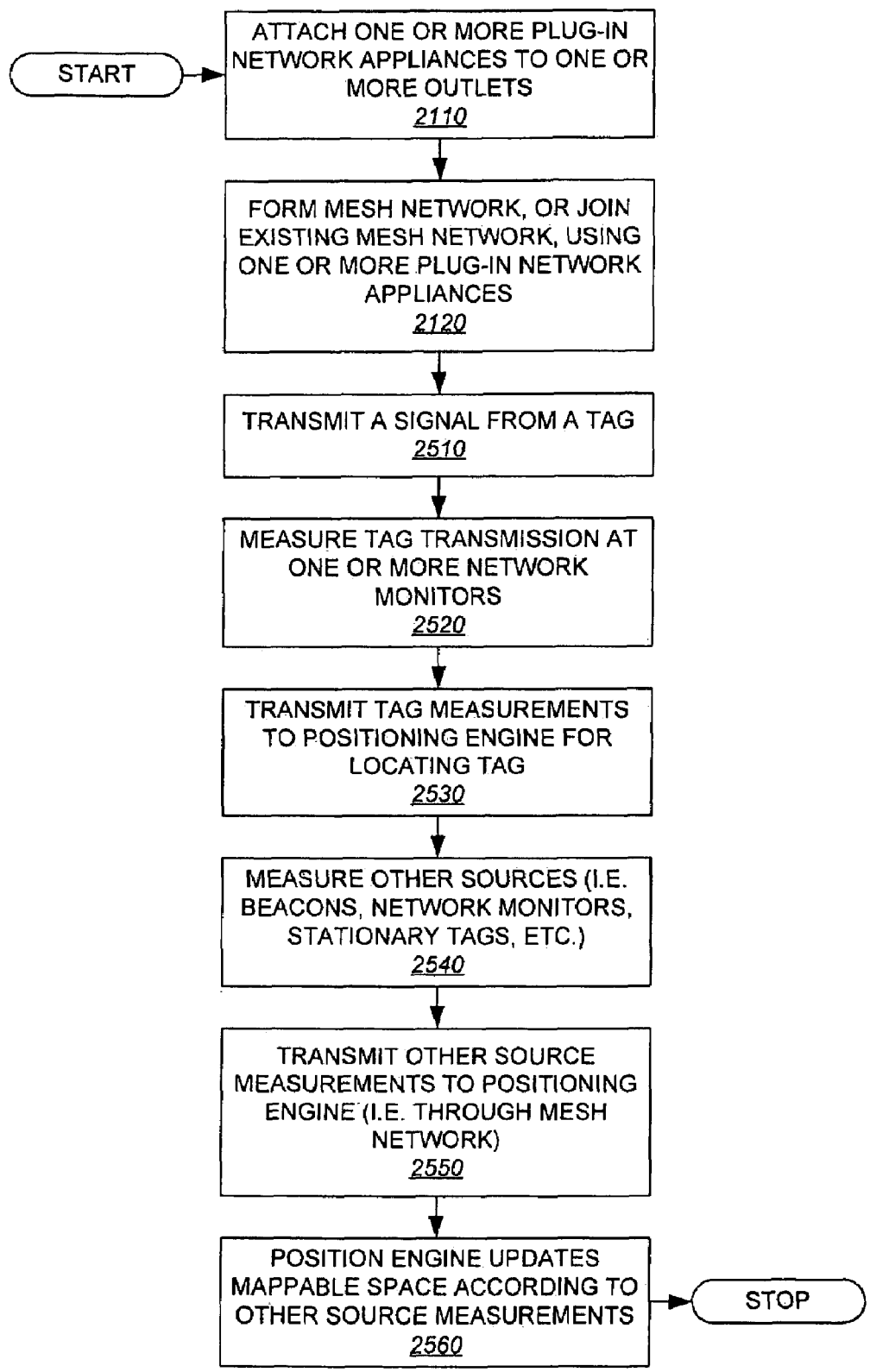
FIG. 25 illustrates an example embodiment of a method for performing position location services with a mesh network.

FIG. 25 illustrates an example embodiment of a method 2500 for performing position location services with a mesh network. In this example, one or more plug-in network appliances may be used to form one or more nodes of the mesh network. Note that the plug-in form factor is not mandatory. Position location services, as described, may be performed using any type of mesh network and one or more of the techniques detailed herein. Steps 2110-2120 may be performed as illustrated above with respect to FIG. 21, wherein one or more network appliances are attached to one or more outlets, and a mesh network is formed, or a mesh network joined, using one or more plug-in network appliances. Again, note that a plug-in network appliance need not be deployed in this embodiment. Rather, any combination of network monitors and tags, as detailed herein, may be deployed.

At 2510, a signal is transmitted from a tag, i.e. tag 770 illustrated above. At 2520, the tag transmission is measured at one or more network monitors. For example, nodes 2010E-H operate as network monitors and receive signal 2090 from tag 770B, as illustrated above with respect to FIG. 20. At 2530, transmit tag measurements to a positioning engine for locating the tag. In this example, a portion of the link between the one or more network monitors and the positioning engine comprises a mesh network. Additional links may be employed as well. Note that this process of measuring tag transmissions and transmitting those measurements to a positioning engine may be repeated for as many tags for which tracking is desired, and at a frequency that may be different than the environment updating steps detailed below.

At 2540, various other sources, i.e. beacons, network monitors, stationary tags, and the like may be measured. These measurements may be made at any device within the network, including tags, access points, etc. In the example embodiment, network monitors perform these measurements. In one embodiment, signals transmitted from a tag may be used for such measurements, wherein the tag, in general, remains in a fixed location (at least for a substantial duration). In an alternate embodiment, network monitors may measure transmission from other network monitors to generate these other source measurements. At 2550, the other source measurements are transmitted to the positioning engine. In this embodiment, these measurements are transmitted through the mesh network. At 2560, the position engine may update a mappable space according to other source measurements, as well as any other parameters (such techniques are detailed above). In the example embodiment, tag locations may be made in conjunction with tag measurements, described above, in accordance with such a mappable space. Alternate embodiments may use any number of other positioning location determination techniques.

In the foregoing, various methods have been described using example sets of blocks. Those of skill in the art will recognize that method steps can be interchanged, and subsets of methods defined, without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a device. In the alternative, the processor and the storage medium may reside as discrete components in a device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim as our invention:

1. A mesh network in an indoor facility, the mesh network comprising:
    a plurality of mesh nodes distributed about the indoor facility, each mesh node connected via a wireless link with at least one other mesh node, each mesh node comprising:
    an enclosure;
    a processor positioned within the enclosure;
    a plurality of wireless local area network interfaces positioned within the enclosure and in communication with the processor, each of the plurality of wireless local area network interfaces comprising at least one transceiver for receiving and transmitting data according to a communication format;
    a plug extending outward from the enclosure, the plug physically and electrically connecting the mesh node with an outlet of the indoor facility; and
    means for bridging data between at least two communication formats,
    wherein the plurality of mesh nodes includes at least one mesh node in wired connection with an attached device.

2. The mesh network of claim 1, wherein the plurality of mesh nodes includes a first mesh node connected at least to a second mesh node via a first wireless link and to a third mesh node via a second wireless link, the first and second mesh nodes communicating over the first wireless link in accordance with a first communication format, the first and third mesh nodes communicating over the second wireless link in accordance with a second communication format, wherein the second communication format differs from the first communication format.

3. The mesh network of claim 1, wherein the attached device includes one of a workstation, a server, a printer, and a user terminal.

4. The mesh network of claim 1, wherein the plurality of mesh nodes includes at least one access point mesh node, the access point mesh node being connected to at least one other mesh node via a first wireless link and to at least one user terminal via a second wireless link.

5. The mesh network of claim 1, wherein the plurality of mesh nodes includes at least one mesh node connected to an external network.

6. The mesh network of claim 5, wherein the at least one mesh node connected to the external network is connected by a wired connection.

7. The mesh network of claim 5, wherein the at least one mesh node connected to the external network is connected by a wireless connection.

8. The mesh network of claim 1, farther comprising:
    a position location engine connected to one of the plurality of mesh nodes; and
    a tag located within the indoor facility, the tag emitting a signal for receipt by at least one neighboring mesh node, wherein the at least one neighboring mesh node processes the signal to generate position location information for the tag and transfers the position location information to the position location engine.

9. The mesh network of claim 8, wherein the at least one neighboring mesh node is connected to the position location engine by at least one intermediate mesh node, such that the at least one intermediate mesh node receives the position location information from the neighboring mesh node and then transmits the position location to the position location engine.

10. The mesh network of claim 8, wherein a plurality of tags are located within the indoor facility, each of the plurality of tags having its own identifier information.

11. The mesh network of claim 1, wherein the mesh network utilizes a proactive mesh routing algorithm to route data across the plurality of mesh nodes.

12. The mesh network of claim 1, wherein the mesh network utilizes a reactive mesh routing algorithm to route data across the plurality of mesh nodes.

13. The mesh network of claim 12, wherein the reactive mesh routing algorithm includes one of Dynamic Source Routing (DSR) protocol, Ad-hoc On-demand Distance Vector (AODV), and Topology Based on Reverse Path Forwarding (TBRPF).

14. A system for an indoor facility, the system comprising:
a mesh network including a plurality of mesh nodes distributed about the indoor facility, each mesh node connected via a wireless link with at least one other mesh node, each mesh node comprising:
an enclosure;
a processor positioned within the enclosure;
at least one wireless local area network interface positioned within the enclosure and in communication with the processor, the wireless local area network interface comprising at least one transceiver for receiving and transmitting data according to a communication format; and
a plug extending outward from the enclosure, the plug physically and electrically connecting the mesh node with an outlet of the indoor facility, such that the mesh node remains at a stationary location within the indoor facility;
at least one attached device in wired communication with a respective one of the plurality of mesh nodes;
a position location engine connected to one of the plurality of mesh nodes; and
at least one tag located within the indoor facility, the tag emitting a signal for receipt by at least one neighboring mesh node,
wherein the at least one neighboring mesh node processes the signal to generate position location information for the tag and transfers the position location information to the position location engine.

15. The system of claim 14, further comprising at least one connection to an external network, the external network being accessed via a respective one of the plurality of mesh nodes.

16. The system of claim 14, wherein the attached device includes one of a workstation, a sewer, a printer, and a user terminal.

17. The system of claim 14, wherein the plurality of mesh nodes includes a first mesh node connected at least to a second mesh node via a first wireless link and to a third mesh node via a second wireless link, the first and second mesh nodes communicating over the first wireless link in accordance with a first communication format, the first and third mesh nodes communicating over the second wireless link in accordance with a second communication format, wherein the second communication format differs from the first communication format.

18. The system of claim 14, wherein the plurality of mesh nodes include at least one access point mesh node, the access point mesh node being connected to at least one other mesh node via a first wireless link and to at least one user terminal via a second wireless link.

19. A method for transmitting and receiving tracking information for a plurality of mobile objects on a continuous basis in a facility utilizing an indoor wireless network, the method comprising:
transmitting position location information signals on a continuous periodic basis for each of the plurality of mobile objects, the position location information signals for each of the plurality of mobile objects transmitted from a RFID tag attached to each of the plurality of mobile objects, the RFID tag of each of the plurality of mobile objects transmitting the position location information signals in a first communication format at a low power;
connecting a plurality of stationary devices to power from a plurality of wall outlets within the facility to form an indoor wireless network, each of the plurality of stationary devices comprising:
an enclosure;
a processor positioned within the enclosure;
a receiver positioned within the enclosure and in communication with the processor;
a transmitter positioned within the enclosure and in communication with the processor; and
a power converter capable of receiving power from the wall outlet in a first power format and delivering power to the transmitter and receiver in a second power format, the power converter positioned within the enclosure;
receiving position location information signals on a continuous periodic basis at the plurality of stationary devices in a first wireless communication format over a first wireless link from the plurality of mobile objects; and
transmitting the position location information over a second wireless link in a second wireless communication format at a high power from the plurality of stationary devices to an access point, the high power of the second wireless communication format higher than the low power of the first communication format; and
transmitting the position location information from the access point to a remote position location engine.

20. The method according to claim 19 wherein the first wireless communication format and the second wireless communication format are the same.

21. The method according to claim 19 wherein the first wireless communication format is a low power communication format and the second wireless communication format is a high power communication format.

22. A system for an indoor facility, the system comprising:
a wireless network including a plurality of stationary devices distributed about the indoor facility, each stationary device comprising:
an enclosure;
a processor positioned within the enclosure;
at least one wireless local area network interface positioned within the enclosure and in communication with the processor, the wireless local area network interface comprising at least one transceiver for receiving and transmitting data according to a communication format;

a plurality of access points, each of the plurality of access point in communication with at least one of the plurality of stationary devices; and a position location engine in communication with each of the plurality of access points; and a plurality of mobile objects within the indoor facility, each of the plurality of mobile objects comprising a RFID tag for emitting on a continuous periodic basis a position location tracking signal for receipt by the plurality of stationary devices;

wherein the position location tracking signals from each of the RFID tags of each of the plurality of mobile objects are utilized to generate position location information for each of the plurality of mobile objects by the position location engine.

* * * * *